United States Patent [19]
Uchiumi et al.

[11] Patent Number: 5,802,315
[45] Date of Patent: Sep. 1, 1998

[54] PICTURE REPRODUCING APPARATUS

[75] Inventors: Tadashi Uchiumi; Akira Iwamoto; Masahiro Shioi, all of Chiba, Japan

[73] Assignee: Sharp Kabushiki Kaisha, Osaka, Japan

[21] Appl. No.: 707,378

[22] Filed: Sep. 4, 1996

[30] Foreign Application Priority Data

| Sep. 4, 1995 | [JP] | Japan | 7-226777 |
| Sep. 12, 1995 | [JP] | Japan | 7-234183 |
| Nov. 29, 1995 | [JP] | Japan | 7-310668 |

[51] Int. Cl.$^6$ .................................................. H04N 1/43
[52] U.S. Cl. .................. 395/200.77; 348/394; 348/403; 348/405; 382/236; 382/238; 382/248
[58] Field of Search .............. 371/25.1; 395/182.16, 395/183.14, 185.02, 200.51, 200.77; 348/394, 403, 405, 415, 416; 382/236, 238, 248, 251

[56] References Cited

U.S. PATENT DOCUMENTS 5,151,904  9/1992  Reiner et al. ......................... 371/43.7

FOREIGN PATENT DOCUMENTS 5-316369  11/1993  Japan .

*Primary Examiner*—Thomas Peeso

[57] ABSTRACT

A picture reproducing apparatus transmits coded picture data and an algorithm for reproducing (decoding) the coded picture data and reconfigures a decoding processor in accordance with the received algorithm. The apparatus includes a unit for receiving the picture reproducing algorithm described in a logical description language, performing picture reproduction in accordance with the received algorithm, and reconfiguring a picture decoder in accordance with the received algorithm, a unit for adding a test routine to the algorithm in order to perform an operation test of the received algorithm in a program download manner, and a picture encoder for selecting an optimum coding system for each input frame and transmitting a coding system descriptor code.

26 Claims, 20 Drawing Sheets

PICTURE REPRODUCING APPARATUS

BACKGROUND OF THE INVENTION

(1) Field of the Invention

The present invention relates to a picture reproducing apparatus capable of receiving coded picture or video data from a network and decoding and reproducing the picture. More specifically, the present invention relates to an encoding/decoding apparatus which includes an encoder for transmitting coded data and a tool constituting an algorithm for decoding the data and a decoder for reconfiguring the received tool as an algorithm and decoding the received coded data in a program download manner. The present invention also relates to a picture encoder for constructing a software download system by transmitting a coding system each time a communication line is connected when transmitting coded picture data to another terminal through the communication line.

(2) Description of the Prior Art

Recently, a picture communication service is realized as a new communication service with the spread of ISDN (Integrated Services Digital Network). Examples are video phones and video conference systems. Also, with the development of mobile transmission networks represented by PHS and FPLMTS, demands on the delicacy, diversity, and portability of services provided are rapidly increasing.

Generally, in systems such as video phones or video conference systems in which picture information is transmitted, the amount of picture information is enormous. Therefore, when the speed and the cost of lines used in transmission are taken into consideration, it is necessary to decrease the amount of picture information to be transmitted by compressing (coding) the picture information before transmitting it.

As coding systems for compressing picture information, JPEG (Joint Photographic coding Experts Group) as a still picture coding system, H. 261 as a moving picture coding system, and MPEG1 and MPEG2 (Moving Picture coding Expert Group) as storage type moving picture coding systems are already internationally standardized. In addition, MPEG4 as a coding system at a very low bit rate of 64 kbps or less is being standardized.

MPEG4 can flexibly cope with various applications and provide an optimum encoding system for each application.

Therefore, unlike the existing JPEG, H. 261, MPEG1, and MPEG2 encoding systems in which encoding is performed in accordance with an algorithm, MPEG4 must be an encoding system in which large numbers of tools (transformers, quantizers, inverse transformers, and inverse quantizers or dequantizers) of an encoder are provided and encoding is performed by properly combining these tools.

FIG. 1A is a view showing the format of a data sequence or stream of coded data obtained by encoding (compressing) picture data in accordance with H. 261. Each coded data such as motion vector information, a DCT coefficient, or a quantization step shown in FIG. 1A is picture information encoded (compressed) on the basis of a fixed encoding algorithm in an encoder. A decoder includes a fixed decoding algorithm with respect to this encoding algorithm and decodes each received coded data.

FIG. 1B is a view showing the format of a data sequence of coded data obtained when an algorithm such as MPEG4 encodes (compresses) picture data by using a flexible encoding system. The coded data sequence shown in FIG. 1B consists of coded (compressed) picture information such as motion vector information 2, a transform coefficient 4, motion vector information 6, a transform coefficient 8, and a quantization step 10, and tool information such as a motion compensation tool 1, an inverse transform tool 3, a motion compensation tool 5, an inverse transform tool 7, and a quantization tool 9 for decoding the respective corresponding picture information. Each tool information such as the motion compensation tool 1 can be selected from a plurality of different pieces of tool information, and any arbitrary combination of these pieces of tool information can be selected. Accordingly, the encoder transmits the picture information and the tool information used in the encoding to the decoder, and the decoder decodes the received coded picture information by using the tool information transmitted from the encoder.

Methods of realizing these encoding/decoding processes include a method using dedicated hardware and software and a method which executes appropriate software by using a general-purpose arithmetic unit and a compiler.

The method which realizes the encoding process by using dedicated hardware and software will be described below. FIG. 2 is a block diagram showing the configuration of an encoder which generates the coded data shown in FIG. 1A in accordance with H. 261. Referring to FIG. 2, this encoder includes an encoding controller 11 for controlling encoding, a transformer 12 for calculating DCTs, a quantizer 13 for quantizing the coefficient transformed by the transformer 12, an inverse quantizer 14 for inversely quantizing the coefficient quantized by the quantizer 13, an inverse transformer 15 for calculating inverse DCTs, a memory 16, and a loop filter 17. The memory 16 has a motion compensation variable delaying function used in motion compensation interframe prediction. The filter 17 is a loop filter which can be turned on or off for each macroblock.

In realizing an encoding algorithm for generating the coded data shown in FIG. 1A by using dedicated hardware and software, the functions of tools constituting this algorithm are achieved by dedicated hardware and software, i.e., the encoding controller 11, the transformer 12, the quantizer 13, the inverse quantizer 14, the inverse transformer 15, the memory 16 having the motion compensation delaying function, and the loop filter 17. FIG. 3 is a block diagram showing the configuration of a decoder for decoding coded data encoded in accordance with H. 261. This decoder shares the components of the encoder shown in FIG. 2. The same reference numerals as in FIG. 2 denote the same parts in FIG. 3. That is, the decoder shown in FIG. 3 includes the inverse quantizer 14, the inverse transformer 15, the memory 16 having the motion compensation variable delaying function, and the loop filter 17.

The coded data encoded by the encoder shown in FIG. 2 is inversely quantized by the inverse quantizer 14 and decoded by calculating inverse DCTs by the inverse transformer 15. The memory 16 and the loop filter 17 are used in decoding motion compensated predictive coded data.

To process several different algorithms by using the system which performs encoding by using a fixed algorithm such as H. 261, dedicated hardware and software must be provided for each algorithm. FIG. 4 is a block diagram showing the structure of an encoder which encodes moving pictures in accordance with H. 261 and encodes still pictures in accordance with JPEG. As an example, when one terminal encodes moving pictures and still pictures in accordance with H. 261 and JPEG, respectively, the configuration of the encoder is as shown in FIG. 4. That is, the encoder includes both an H. 261 encoder 20 and a JPEG encoder 21. In FIG.

4, the H. 261 encoder 20 and the JPEG encoder 21 receive moving picture data and still picture data, respectively, and output respective coded data as compressed data.

To realize an algorithm for generating the coded data shown in FIG. 1B by using dedicated hardware and software, an encoder for realizing this algorithm is achieved by replacing the configuration of a circuit block 18 of the encoder shown in FIG. 2 with a configuration shown in FIG. 5. That is, this encoder includes a plurality of different tools in each of the transformer 12, the quantizer 13, the inverse quantizer 14, and the inverse transformer 15 and performs encoding by selecting necessary tools from these tools (transformer tools A to X, quantizer tools A to X, inverse quantizer tools A to X, and inverse transformer tools A to X in FIG. 5).

A decoder for decoding the coded data shown in FIG. 1B is accomplished by replacing a circuit block 19 constituting the decoder shown in FIG. 3 with a circuit block 22 shown in FIG. 5. That is, this decoder has a plurality of different tools in each of the inverse quantizer 14 and the inverse transformer 15 and performs decoding by selecting necessary tools from these tools (inverse quantizer tools A to X and inverse transformer tools A to X in FIG. 5).

In this decoding process, the tool information shown in FIG. 1B, i.e., the motion compensation tool 1, the inverse transform tool 3, the motion compensation tool 5, the inverse transform tool 7, and the quantization tool 9, are transmitted to a controller 23. The picture information following these tool information, i.e., the motion vector information 2, the transform coefficient 4, the motion vector information 6, and the transform coefficient 8, are transmitted to the respective corresponding tools for processing these picture information. The controller 23 selects tools to be used (from the inverse quantizers A to X and the inverse transformers A to X in FIG. 5) on the basis of the tool information. Each picture data is decoded by using the tools selected by the controller 23.

The method of realizing decoding by executing appropriate software by using a general-purpose arithmetic unit and a compiler will be described below. Decoding of coded data with the structure shown in FIG. 1B will be described with reference to FIG. 6. FIG. 6 is a block diagram showing the structure of a decoder consisting of a general-purpose arithmetic processor 24 and a compiler 25. The tool information shown in FIG. 1B, i.e., the motion compensation tool 1, the inverse transform tool 3, the motion compensation tool 5, the transform tool 7, and the quantization tool 9, are supplied to the compiler 25 which in turn generates a processing program for controlling the operation of the general-purpose arithmetic processor 24. The picture information following these pieces of tool information, i.e., the motion vector information 2, the transform coefficient 4, the motion vector information 6, the transform coefficient 8, and the quantization step 10, are supplied to the general-purpose arithmetic processor 24. In accordance with the processing program generated by the compiler 25, the general-purpose arithmetic processor 24 processes the coded picture information following the tool information, decodes the coded data, and generates decoded data.

Each tool information transmitted from the encoder contains not only information indicating the type of tool but also a tool main body which describes the procedure of the tool. Consequently, even if the decoder is not equipped with necessary tools, the received coded data can be decoded.

If, however, there is a transmission error in transmitting a tool main body, the received tool main body itself does not normally operate in some instances when coded data is decoded by using this transmitted tool main body. Generally, the error rate rises in data transmission using mobile transmission networks. If an error occurs in data, such as information of a tool main body, which describes the procedure itself, not only the data processing of the system is not normally executed but a fatal operation failure sometimes occurs in the whole system.

A general method by which this is prevented is to check whether received data has an error by adding a parity to transmission data. That is, a parity is added in units of certain transmission blocks, and an arithmetic operation is performed for this parity and a data main body. On the basis of the result of the arithmetic operation, whether the received data has an error is determined on the receiver side. If the receiver side determines that there is no error, the receiver side returns data indicating a reception success. If the receiver side determines that there is an error, the receiver side returns data indicating a reception failure. When receiving the data indicating a reception success, the transmitter side transmits the next block. When receiving the data indicating a reception failure, the transmitter side again transmits the current block. This procedure is repeated in units of transmission blocks.

FIG. 7 is a flow chart for explaining an operation algorithm for error determination in conventional decoders. This algorithm is used to perform error determination when a data sequence having the structure shown in FIG. 1B is received.

When coded data is received, whether a tool 1 contained in this coded data has an error is checked (step S1). If it is determined that the tool 1 has an error (No in step S1), a request to retransmit the tool 1 is output to the transmission side (step S2), and the flow waits for retransmitted data. If there is no error in the tool 1 (Yes in step S1), whether a tool 2 has an error is checked (step S3). If it is determined that the tool 2 has an error (No in step S3), a request to retransmit the tool 2 is output to the transmission side (step S4), and the flow waits for retransmitted data. If there is no error in the tool 2 (Yes in step S3), the received coded data is decoded by using these tools 1 and 2 (step S5), and the flow waits until the next coded data is input.

When the next coded data is received, whether a tool 3 contained in this coded data has an error is checked (step S6). If it is determined that the tool 3 has an error (No in step S6), a request to retransmit the tool 3 is output to the transmission side (step S7), and the flow waits for retransmitted data. If there is no error in the tool 3 (Yes in step S6), whether a tool 4 has an error is checked (step S8). If it is determined that the tool 4 has an error (No in step S8), a request to retransmit the tool 4 is output to the transmission side (step S9), and the flow waits for retransmitted data. If there is no error in the tool 4 (Yes in step S8), whether a tool 5 has an error is checked (step S10). If it is determined that the tool 5 has an error (No in step S10), a request to retransmit the tool 5 is output to the transmission side (step S11), and the flow waits for retransmitted data. If there is no error in the tool 5 (Yes in step S10), the received coded data is decoded by using these tools 3, 4 and 5 (step S12), and the flow waits until the next coded data is input.

In the error determination algorithm described above, if even one tool in which an error is detected exists, no decoding processing is executed by using other normal tools. That is, no decoding is performed until no more error is detected in all tools. Also, if an error is detected in a certain transmission block in the tool 1 contained in the received coded data (No in step S1), the retransmission procedure of the tool 1 (step S2) is completed, and error determination is again executed for the retransmitted tool (step S1). Unless it is determined that the tool 1 is normally received, the encoder does not transmit the next transmission block (tool 2).

As a consequence, if the number of retransmission procedures increases, the operating efficiency on the reception side significantly decreases. This also decreases the use efficiency of the communication transmission path. Furthermore, even when a tool is normally transmitted, whether the tool normally operates on the receiver side can be checked by neither the transmitting terminal nor the receiving terminal.

Conventionally, moving pictures are reproduced on general-purpose computers such as personal computers as well as the encoding/decoding apparatus shown in FIGS. 2 and 3. Since a plurality of picture data can be reproduced on a single computer by using a plurality of picture reproducing software, this computer can be regarded as a general-purpose picture reproducing apparatus.

Conventional dedicated picture reproducing apparatuses including the above prior art have a high picture reproducibility. However, to reproduce picture data to be reproduced by different picture reproducing algorithms, it is necessary to prepare different picture reproducing apparatuses corresponding to these picture data.

A general-purpose picture reproducing apparatus is configured such that software of a specific picture reproducing algorithm is executed on general-purpose hardware. Therefore, a plurality of picture reproducing algorithms can be executed on single hardware by preparing software for each of different picture reproducing algorithms. The disadvantage of these general-purpose picture reproducing apparatuses is a lower picture reproducibility than that of dedicated picture reproducing apparatuses.

As described earlier, the picture coding system at a very low bit rate is being actively, internationally standardized as MPEG4 (Moving Picture Experts Group 4). Also, many new coding systems have been developed for picture coding techniques such as a DCT system and a Wavelet transform system. It is considered that the number of coding systems will continue to increase in the future.

The purpose of this MPEG4 is to give a coding system which is versatile and expandable independent of machines. As a consequence, a software download type system is constructed. Accordingly, an MSDL (MPEG4 Syntax Description Language) is constructed which generally describes a picture data encoding/decoding method, a method of transmission of the encoding/decoding method, security in transmission, and a transmission error countermeasure.

FIG. 8 shows the components of the MSDL. A coding system descriptor code which is the description of a picture data encoding/decoding method is constituted by a plurality of profiles. One profile has a plurality of algorithms, and one algorithm has a plurality of tools. Thus the coding system descriptor code has a tree structure, and these tools, configuration methods of the tools, and intertool interfaces are described by the MSDL. Also, in the existing coding system descriptor codes, a new coding system descriptor code can be constituted by the MSDL by exchanging or adding tools.

The MPEG 4 defines Configuration Phase, Learning Phase, and Transmission Phase during communication, and the contents of processing are determined for each phase. In Configuration Phase, to start call setting or establish a communication path, whether an encoder and a decoder can perform appropriate communication is checked. For this purpose, parameters describing, e.g., capability, conditions, and environment are exchanged. Also, after these parameters are exchanged, an environment for communication is determined or whether the control is to proceed on to next Learning Phase is checked. In Learning Phase, to allow the decoder to correctly analyze coded data transmitted from the encoder, transmission of an analysis method itself or construction of the analysis method is designated. In Transmission Phase, coded data is transmitted by the format specified in these two phases.

FIG. 9 shows a conventional picture encoding apparatus of the MPEG4 system. In FIG. 9, reference numeral 31 denotes a communication state controller; 32, a picture encoder; and 33, a coding system descriptor code transmitter. The communication state controller 31 controls the state of communication and, in accordance with the communication state, selects transmission of picture coded data or transmission of a coding system descriptor code. The picture encoder 32 encodes an input picture and forms picture coded data. The coding system descriptor code transmitter 33 transmits tools constituting the coding system used in the picture encoder 32 in order for the terminal on the other end to recognize the coding system. In Learning Phase described above, contacts a and c of a switch are closed and the coding system descriptor code used in the apparatus is transmitted to the partner terminal. When the control proceeds on to Transmission Phase, contacts b and c of the switch are closed and the picture coded data formed by the picture encoder 32 is transmitted.

With this configuration, a software download type system can be constructed. Consequently, any new developed coding system can be processed.

Presently, various coding systems have been developed in addition to the systems described above, and it is difficult to discriminate between them, i.e., it is difficult to choose one of these coding systems. These coding systems have their respective features, and different types of pictures have different appropriate coding systems. Also, cameras for inputting pictures may be switched, or panned or tilted, or the object itself may be changed during communication. In these cases the properties of an input picture largely change. Consequently, it is necessary to switch coding systems during communication in order to transmit clearer pictures in a narrow band. However, in the conventional picture communication systems the coding systems cannot be switched during communication.

SUMMARY OF THE INVENTION

To simultaneously solve the above conventional problems, it is an object of the present invention to provide a picture reproducing apparatus which can reconfigure the contents of hardware processing and software processing in accordance with a change in a picture reproducing algorithm and therefore constantly has an optimum processing capability for a picture reproducing algorithm.

It is another object of the present invention to provide a program download system of an encoding/decoding apparatus by which whether a decoding tool and an algorithm normally operate is checked on a receiver side (decoder) and a decoding tool and an algorithm not found to normally operate by the decoder can be retransmitted from a transmitter side without decreasing the operating efficiencies of a communication transmission path and a terminal device on the receiver side.

It is still another object of the present invention to provide a picture reproducing apparatus for transmitting a coding system descriptor code and selecting an optimum coding system for each input frame.

To achieve the above objects, the aspects of the present invention are as follows.

The first aspect of the present invention is a picture reproducing apparatus for transmitting coded picture data and an algorithm for reproducing (decoding) the coded picture data, and reconfiguring a decoding processor in accordance with the received algorithm, including a program converter for converting a program in which the picture reproducing algorithm is described in a logical description language into a form which can change a configuration of a picture decoder, wherein a processing system of the picture decoder is reconfigured in accordance with contents of the program converted by the program converter.

The second aspect of the present invention is a picture reproducing apparatus for transmitting coded picture data and an algorithm for reproducing (decoding) the coded picture data, and reconfiguring a decoding processor in accordance with the received algorithm, including a receiver for receiving a program in which the picture reproducing algorithm is described in a logical description language, a program converter for converting the program into a form which can change a configuration of a picture decoder, and a controller for controlling the receiver, the program converter, and the picture decoder, wherein the controller causes the program converter to convert the program received by the receiver and reconfigures a processing system of the picture decoder in accordance with contents of the converted program.

The third aspect of the present invention is a picture reproducing apparatus described in the second aspect, wherein the program converter includes a divider for dividing the picture reproducing algorithm into a first program portion which converts the program described in a logical description language into a form which can change the configuration of the picture decoder, and a second program portion which is executed by the controller in picture reproduction, a first converter for converting the first program portion into a form which can change the configuration of the picture decoder, and a second converter for converting the second program portion into a form which can be interpreted and executed by the controller.

The fourth aspect of the present invention is a picture reproducing apparatus described in the second or third aspect, wherein the picture decoder includes an inverse quantizer for inversely quantizing quantized picture data, contents of the inverse quantization being changeable, and an inverse transformer for inversely transforming transformed picture data, contents of the inverse transformation being changeable, and the controller changes the contents of the inverse quantization and the contents of the inverse transformation in accordance with the contents of the program converted by the program converter.

The fifth aspect of the present invention is a picture reproducing apparatus which transmits coded picture data and an algorithm for reproducing (decoding) the coded picture data, and reconfigures a decoding processor in accordance with the received algorithm, and in which an encoder transmits to a decoder coded data and a tool constituting an algorithm for decoding the coded data, and the decoder reconfigures the algorithm by using the tool and decodes the received coded data in a program download manner by using the reconfigured algorithm, wherein the encoder transmits to the decoder a test routine for performing an operation test of the algorithm together with the tool, and the decoder performs the operation test in accordance with the test routine and checks on the basis of the result of the operation test whether the reconfigured algorithm normally operates.

The sixth aspect of the present invention is a picture reproducing apparatus described in the fifth aspect, wherein the test routine includes a test item for each tool constituting the algorithm, and the decoder performs an operation test of the algorithm for each tool in accordance with the test item and checks on the basis of the result of the operation test for each tool whether the reconfigured algorithm normally operates.

The seventh aspect of the present invention is a picture reproducing apparatus described in the fifth aspect, wherein the test routine is provided for each tool, and the decoder performs an operation test for each tool in accordance with the test routine provided for the tool and checks on the basis of the result of the operation test for each tool whether the reconfigured algorithm normally operates.

The eighth aspect of the present invention is a picture reproducing apparatus described in the fifth aspect, wherein the decoder requests the encoder to retransmit a tool which constitutes the algorithm and is found not to normally operate, and on the basis of the request the encoder retransmits to the decoder the tool found not to normally operate by the decoder.

The ninth aspect of the present invention is a picture reproducing apparatus described in the fifth aspect, wherein when the decoder determines that a tool normally operates, the decoder immediately executes a procedure of decoding coded data to be processed by the tool.

The tenth aspect of the present invention is a picture reproducing apparatus for transmitting coded picture data and an algorithm for reproducing (decoding) the coded picture data, and reconfiguring a decoding processor in accordance with the received algorithm, including a picture encoder for encoding an input picture, a coding system descriptor code transmitter means for transmitting to a partner terminal a coding system descriptor code describing a coding system used by the picture encoder, a communication state controller for managing a state of communication and, in accordance with the state of communication, selecting one of transmission of the picture coded data and transmission of the coding system descriptor code, a plurality of picture encoder for encoding an input picture by using different coding systems, and a coding system selector for determining a coding system to be used, wherein an appropriate picture coding system is selected for each frame of an input picture and, when coded data is transmitted to the partner terminal, the partner terminal is informed of a coding system by which each frame of data is encoded, thereby dynamically switching picture coding systems during communication.

The eleventh aspect of the present invention is a picture reproducing apparatus described in the tenth aspect, wherein the number of coding system descriptor codes transmitted immediately after communication is started is set in accordance with a memory capacity of the partner terminal and, when a user wishes to use a coding system other than the previously transmitted coding systems, one of the already transmitted coding systems is made invalid and the coding system descriptor code to be used instead is transmitted and made valid.

The twelfth aspect of the present invention is a picture reproducing apparatus described in the tenth aspect, wherein a plurality of coding system descriptor codes received from the partner terminal when communication is started or while communication is being performed are correctly recognized, and a coding system by which received picture coded data is encoded is checked for each frame, thereby dynamically switching picture coded data decoding means during communication.

The thirteenth aspect of the present invention is a picture reproducing apparatus described in the eleventh aspect, wherein a plurality of coding system descriptor codes received from the partner terminal when communication is started or while communication is being performed are correctly recognized, and a coding system by which received picture coded data is encoded is checked for each frame, thereby dynamically switching picture coded data decoding means during communication.

The fourteenth aspect of the present invention is a picture reproducing apparatus described in the tenth aspect, wherein the coding system selector includes a picture encoder whose number equals the number of coding systems for performing picture encoding, picture decoders whose number equals the number of coding systems, a squared error calculator whose number equals the number of coding systems, each of the squared error calculators means calculating a squared error between a picture encoded/decoded result and an input picture as an original picture, and a squared error result comparator for checking which coding system has a smallest squared error, and, in order to select a coding system for performing coding, calculates a squared error in each coding system for each frame and selects a coding system with a smallest squared error.

The fifteenth aspect of the present invention is a picture reproducing apparatus described in the eleventh aspect, wherein the coding system selector includes picture encoder whose number equals the number of coding systems for performing picture coding, picture decoder whose number equals the number of coding systems, squared error calculators means whose number equals the number of coding systems, each of the squared error calculators means calculating a squared error between a picture encoded/decoded result and an input picture as an original picture, and a squared error result comparator means for checking which coding system has a smallest squared error, and, in order to select a coding system for performing coding, calculates a squared error in each coding system for each frame and selects a coding system with a smallest squared error.

The sixteenth aspect of the present invention is a picture reproducing apparatus described in the twelfth aspect, wherein the coding system selector includes picture encoders means whose number equals the number of coding systems for performing picture coding, picture decoders whose number equals the number of coding systems, squared error calculators means whose number equals the number of coding systems, each of the squared error calculators calculating a squared error between a picture encoded/decoded result and an input picture as an original picture, and a squared error result comparator means for checking which coding system has a smallest squared error, and, in order to select a coding system for performing coding, calculates a squared error in each coding system for each frame and selects a coding system with a smallest squared error.

The seventeenth aspect of the present invention is a picture reproducing apparatus described in the thirteenth aspect, wherein the coding system selector includes picture encoders means whose number equals the number of coding systems for performing picture coding, picture decoders means whose number equals the number of coding systems, squared error calculators means whose number equals the number of coding systems, each of the squared error calculators means calculating a squared error between a picture encoded/decoded result and an input picture as an original picture, and a squared error result comparator for checking which coding system has a smallest squared error, and, in order to select a coding system for performing coding, calculates a squared error in each coding system for each frame and selects a coding system with a smallest squared error.

The eighteenth aspect of the present invention is a picture reproducing apparatus described in any one of the tenth to seventeenth aspects, wherein the coding system selector includes a picture adaptive coding system selector for selecting an appropriate coding system in accordance with an input picture, and determines a coding system for performing coding by checking, for each frame, which coding system is appropriate to encode a picture.

In the above picture coding apparatus, the plurality of picture encoders form picture coded data by using different picture coding systems, the coding system selector selects a coding system for each frame, the picture decoder decode the data formed by picture encoding, each squared error calculating means calculates a squared error between an input picture and a picture formed by encoding/decoding, the squared error comparator determines which coding system has the smallest squared error in encoding/decoding, and the picture checker checks a type of input picture and determines which coding system is optimum for the picture.

DESCRIPTION OF THE PREFERRED EMBODIMENTS

Embodiments of the present invention will be described below with reference to the accompanying drawings.

First Embodiment

Figure 10:
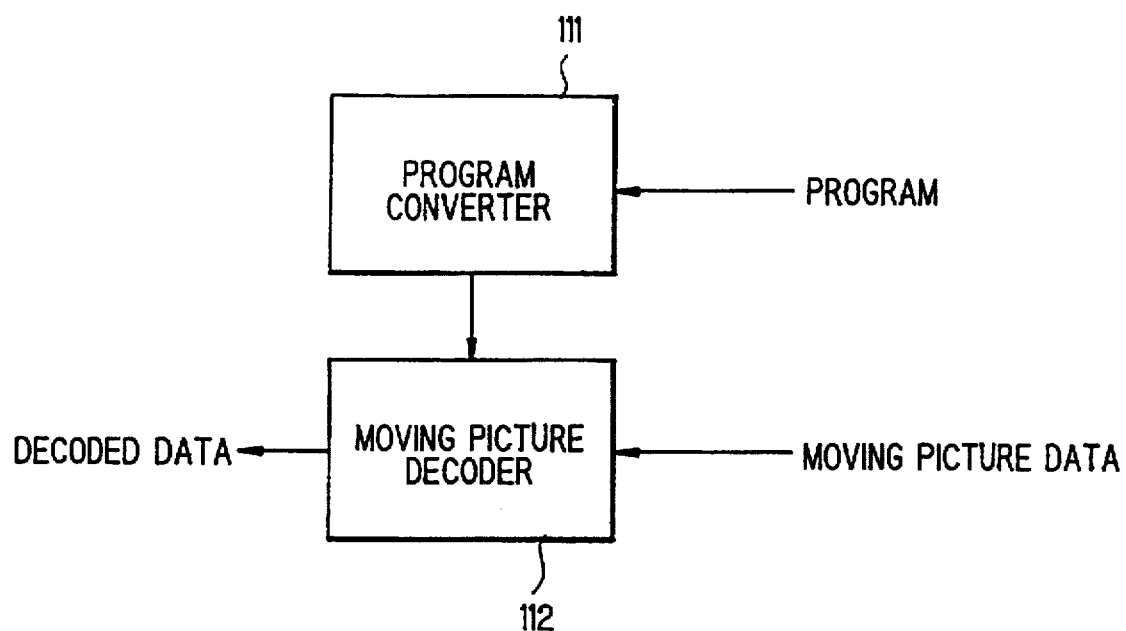
FIG. 10 is a block diagram showing the principle of a picture reproducing apparatus according to the present invention.

FIG. 10 is a block diagram showing the principle of a picture reproducing apparatus according to the present invention. This picture reproducing apparatus reproduces moving pictures and includes a program converter 111 and a moving picture decoder 112. A program in which a moving picture reproducing algorithm is described in a logical description language is input to the program converter 111 where the program is converted into a form which can change the configuration of the moving picture decoder 112. In accordance with the converted program, the moving picture decoder 112 reconfigures the processing system of hardware processing or software processing, decodes coded moving picture data, and reproduces the moving picture.

As described above, before moving picture data is reproduced a moving picture reproducing algorithm is received and the moving picture decoder is reconfigured. Consequently, a plurality of moving picture reproducing algorithms can be executed in a single moving picture reproducing apparatus. Also, since the moving picture decoder is reconfigured in accordance with a moving picture reproducing algorithm, a moving picture reproducing capability equivalent to that of a dedicated moving picture reproducing apparatus can be obtained.

Figure 11:
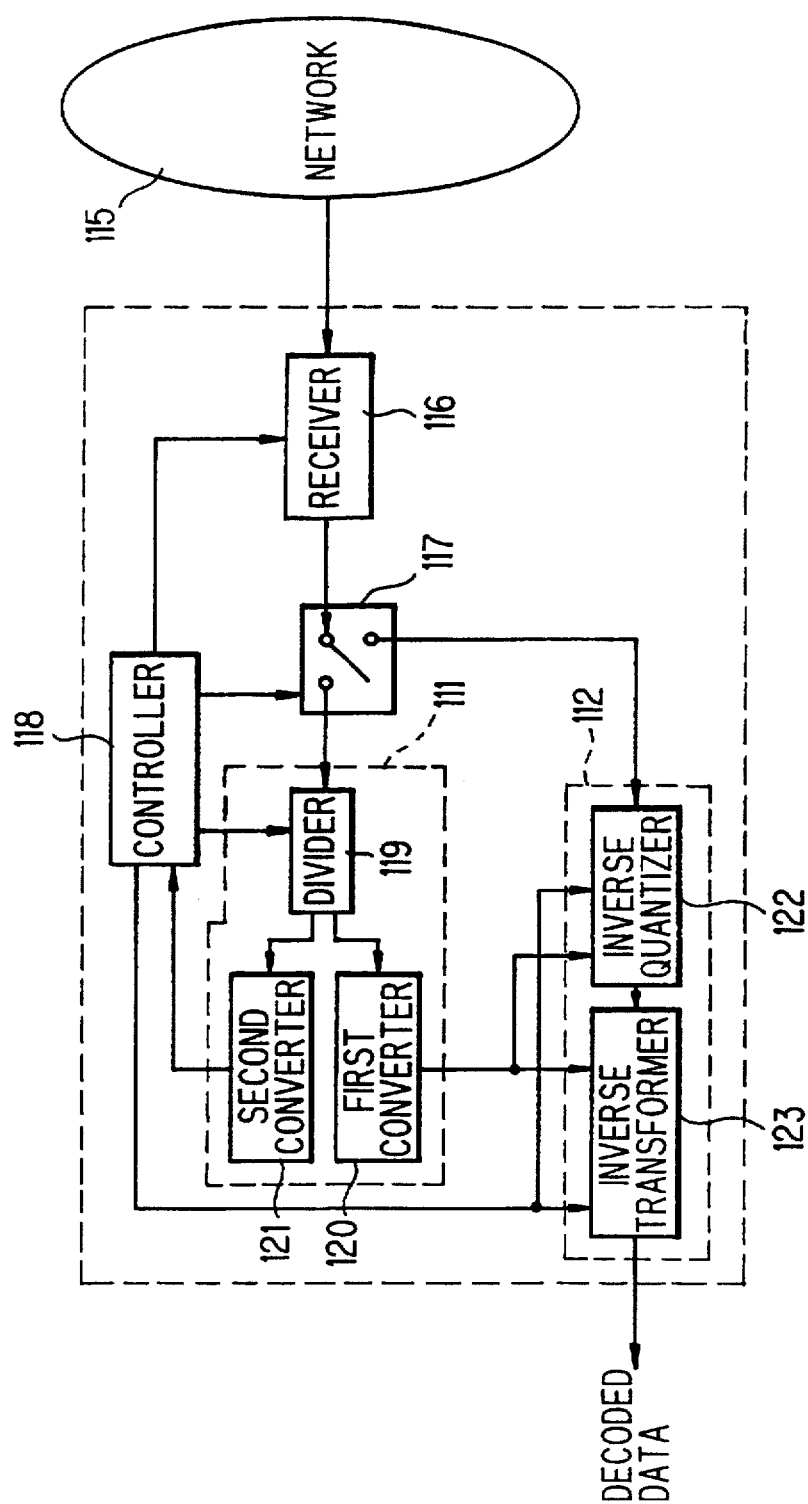
FIG. 11 is a block diagram showing one embodiment of the picture reproducing apparatus according to the present invention.

FIG. 11 is a block diagram showing one embodiment of the picture reproducing apparatus according to the present invention. This picture reproducing apparatus includes a receiver 116, a switch 117, a program converter 111, a moving picture decoder 112 whose processing system can be reconfigured, and a controller 118. The receiver 116 downloads a program for reconfiguring the moving picture decoder and coded moving picture data from a network 115. The switch 117 switches transmission destinations in accordance with whether received data is a program or moving picture data. The program converter 111 converts the program into a form which can change the configuration of the moving picture decoder. The controller 118 controls the receiver 116, the switch 117, the program converter 111, and the moving picture decoder 112.

The program converter 111 includes a divider 119, a first converter 120, and a second converter 121. The divider 119 divides the program into a first program portion to be converted into a form which can change the configuration of the moving picture decoder and a second program portion which is executed by the controller during reproduction of moving pictures. The first converter 120 converts the first program portion into a form capable of changing the configuration of the moving picture decoder. The second converter 121 converts the second program portion into a form which can be interpreted and executed by the controller. The moving picture decoder 112 includes an inverse quantizer 122 and an inverse transformer 123. The inverse quantizer 122 inversely quantizes quantized moving picture data, and the contents of the inverse quantization can be changed. The inverse transformer 123 inversely transforms transformed moving picture data, and the contents of the inverse transform can be changed. Since the processing contents of the inverse quantizer 122 and the inverse transformer 123 must be rewritable, these components need to be programmable elements such as FPGAs.

This moving picture reproducing apparatus receives a program describing a picture reproducing algorithm and coded moving picture data from the network, automatically reconfigures the moving picture decoder 112 in accordance with the program, and reproduces moving pictures by using the algorithm of the program.

A procedure by which the moving picture decoder is reconfigured is as follows. The network 115 inputs a moving picture reproducing program and coded moving picture data to the moving picture reproducing apparatus. First, the receiver 116 receives a program of a moving picture reproducing algorithm described in a logical description language from the network 115. The controller 118 controls the switching means 117 to transmit the received data to the program converter 111. The divider 119 of the program converter 111 divides the program into a first program portion to be processed by hardware and a second program portion to be processed by software. The software processing during reproduction of moving pictures is performed by a processor in the controller 118. The portion to be processed by hardware is transferred to the first converter 120 and converted into a form capable of rewriting FPGA. Thereafter, the controller 118 rewrites the inverse quantizer 122 and the inverse transformer 123. The portion to be processed by software is transferred to the second converter 121, converted into a form capable of being processed by the processor, and transferred to the controller 118.

As described above, since the inverse quantizer 122 and the inverse transformer 123 are formed by elements such as FPGAs whose processing programs are changeable, the hardware processing in the moving picture decoder 112 can be easily reconfigured. Additionally, since the moving picture decoder 112 whose hardware is so reconfigured as to have an optimum processing capability is used, a moving picture reproducing capability equivalent to that of a dedicated moving picture decoder can be obtained.

In reproduction of moving pictures, the receiver 116 receives moving picture data from the network 115. The controller 118 controls the switch 117 to transmit the moving picture data to the moving picture decoder 112. The moving picture data is processed by the inverse quantizer 122 and the inverse transformer 123 in the moving picture decoder 112 and output as decoded data.

In the first embodiment of the present invention described above, the processing system of the picture decoder is reconfigured in accordance with the contents of a program converted by the program converter. Therefore, picture data to be reproduced by different algorithms can be processed. Also, a picture reproducing capability equivalent to that of a dedicated picture reproducing apparatus can be obtained. In addition, a program describing a picture reproducing algorithm is input together with picture data from the network, and the controller reconfigures the picture decoder in accordance with the program so that the decoder has an optimum processing capability. Accordingly, picture data to be reproduced by different algorithms can be automatically processed.

Furthermore, a program describing a picture reproducing algorithm is divided into a first program portion to be converted into a form which can change the configuration of the picture decoder and a second program portion to be executed by the controller during picture reproduction. Consequently, the moving picture decoder can be so reconfigured as to have an optimum processing capability. Therefore, a picture reproducing capability equivalent to that of a dedicated picture reproducing apparatus can be obtained.

Second Embodiment

Figure 12:
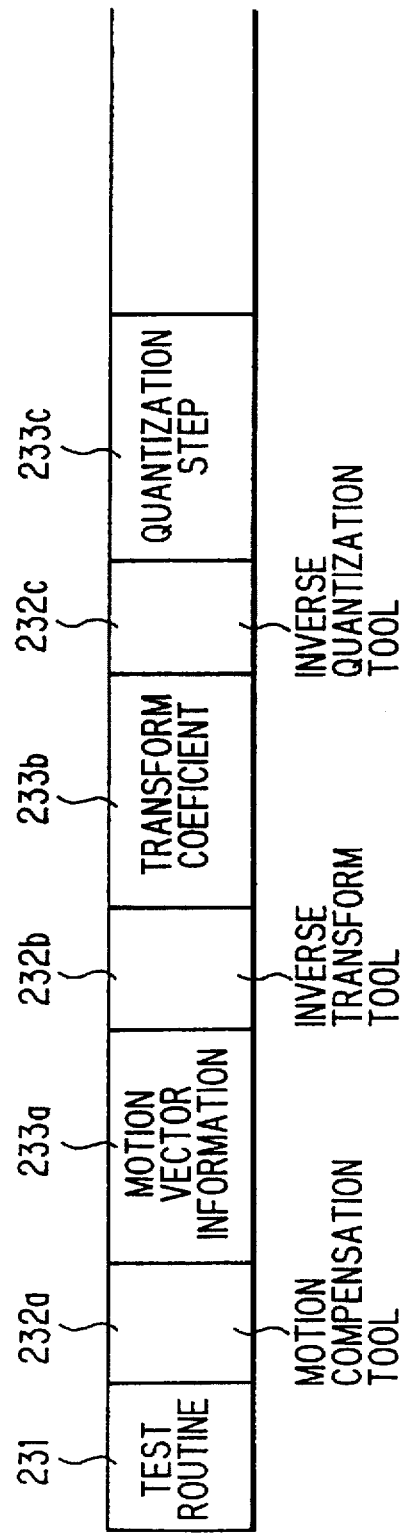
FIG. 12 is a view for explaining the format of a transmission data sequence according to a program download method of the second embodiment of the present invention.

FIG. 12 is a view showing an example of a coded data sequence based on a flexible coding system such as MPEG4 according to a program download system of the present invention. The coded data sequence shown in FIG. 12 has a test routine which is a program routine for performing an operation test of a decoding algorithm, tool information following the test routine 231, such as a motion compensation tool 232a, an inverse transform tool 232b, and an inverse quantization tool 232c, and picture information data such as motion vector information 233a, a transform coefficient 233b, and a quantization step 233c. The test routine 231 contains test items for the individual tools. Operation tests are performed for the tool information 232a to 232c constituting the decoding algorithm on the basis of these test items. Consequently, the operation tests of the decoding algorithm constituted by these tool information 232a to 232c can be performed on the decoder side.

Figure 13:
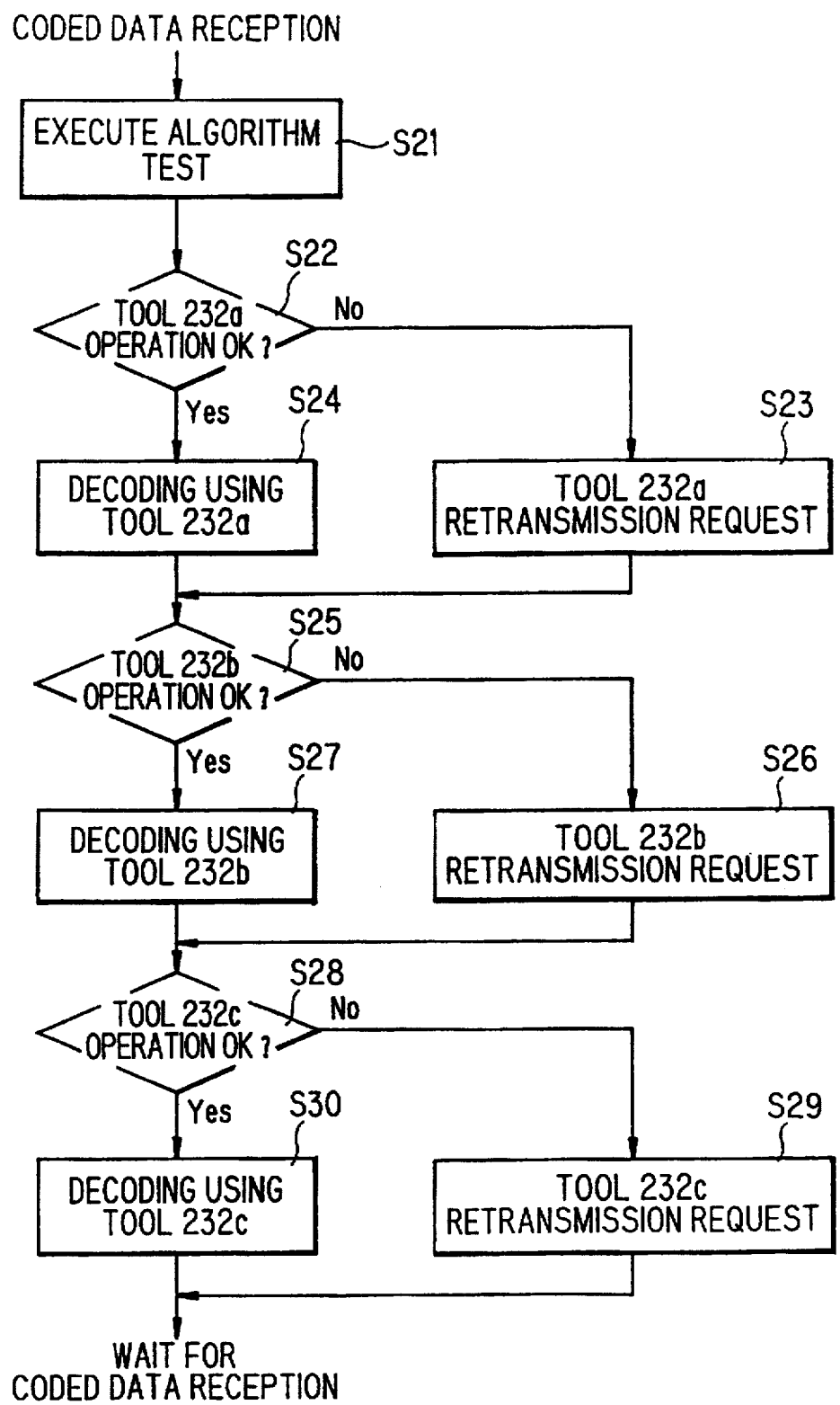
FIG. 13 is a flow chart for explaining an operation algorithm of a decoder according to the program download method of the second embodiment of the present invention.

FIG. 13 is a flow chart for explaining an algorithm for decoding coded data having the format shown in FIG. 12. When all of the tool information 232a to 232c constituting the decoding algorithm are completely received, operation tests are sequentially performed for these tools 232a to 232c on the basis of the test routine 231, and the result is checked each time the test is performed. Details of this procedure will be described below.

First, a decoding algorithm test is executed on the basis of the test routine 231 contained in the received coded data (step S21). The flow then advances to an operation test of each tool. An operation test of the tool 232a is executed and the result is checked (step S22). If it is determined that the tool 232a normally operates (Yes in step S22), the motion vector information 233a is decoded by using the tool 232a (step S24), and the flow advances to an operation test of the tool 232b. If it is determined that the operation of the tool 232a is abnormal (No in step S22), a request to retransmit the tool 232a is output to the transmission side, and the flow immediately advances to the operation test of the tool 232b.

The operation test of the tool 232b is executed and the result is checked (step S25). If it is determined that the tool 232b normally operates (Yes in step S25), the transform coefficient information 233b is decoded by using the tool 232b (step S27), and the flow advances to an operation test of the tool 232c. If it is determined that the operation of the tool 232b is abnormal (No in step S25), a request to retransmit the tool 232b is output to the transmission side, and the flow immediately advances to the operation test of the tool 232c.

The operation test of the tool 232c is executed and the result is checked (step S28). If it is determined that the tool 232c normally operates (Yes in step S28), the quantization step information 233c is decoded by using the tool 232c (step S30), and the flow waits until the next coded information data is received. If it is determined that the operation of the tool 232c is abnormal (No in step S28), a request to retransmit the tool 232c is output to the transmission side, and the flow waits until the next coded data is received.

For a tool found to abnormally operate by an operation test of the tool, a request to retransmit the tool is output to the encoder (step S23, S26, or S29). Thereafter, the flow immediately advances to an operation test of the next tool. If the operation test is normally completed, decoding of picture information data to be processed by that tool is started (step S24, S27, or S30).

For example, if the result of the operation test of the tool 232a is found to be abnormal, the decoder requests the encoder to retransmit the tool 232a (step S23). While the encoder is executing a procedure of retransmitting the tool 232a, the decoder executes the operation test of the tool 232b and checks the test result (step S25).

Figure 1:
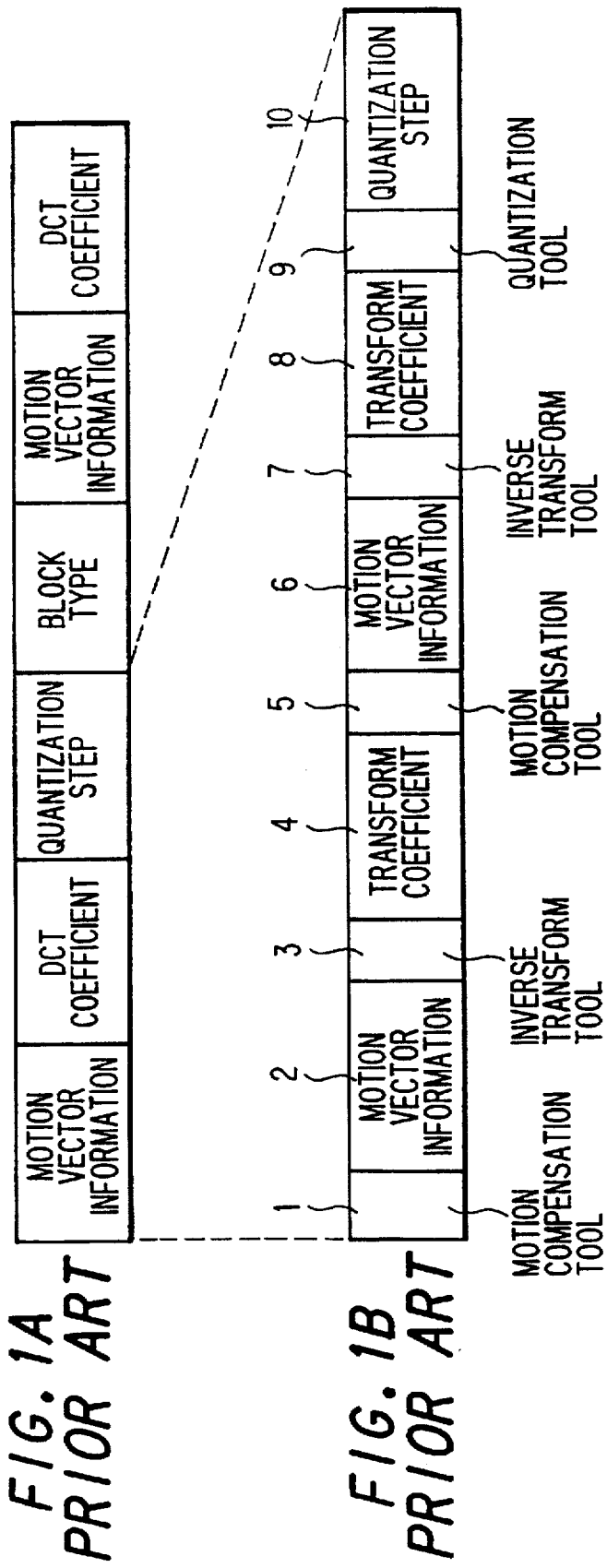
FIG. 1A is a view showing the format of a data sequence of coded data obtained by encoding (compressing) picture data in accordance with H. 261.
FIG. 1B is a view showing the format of a data sequence of coded data obtained by encoding (compressing) picture data by using a coding system with a flexible algorithm such as MPEG4.
Figure 2:
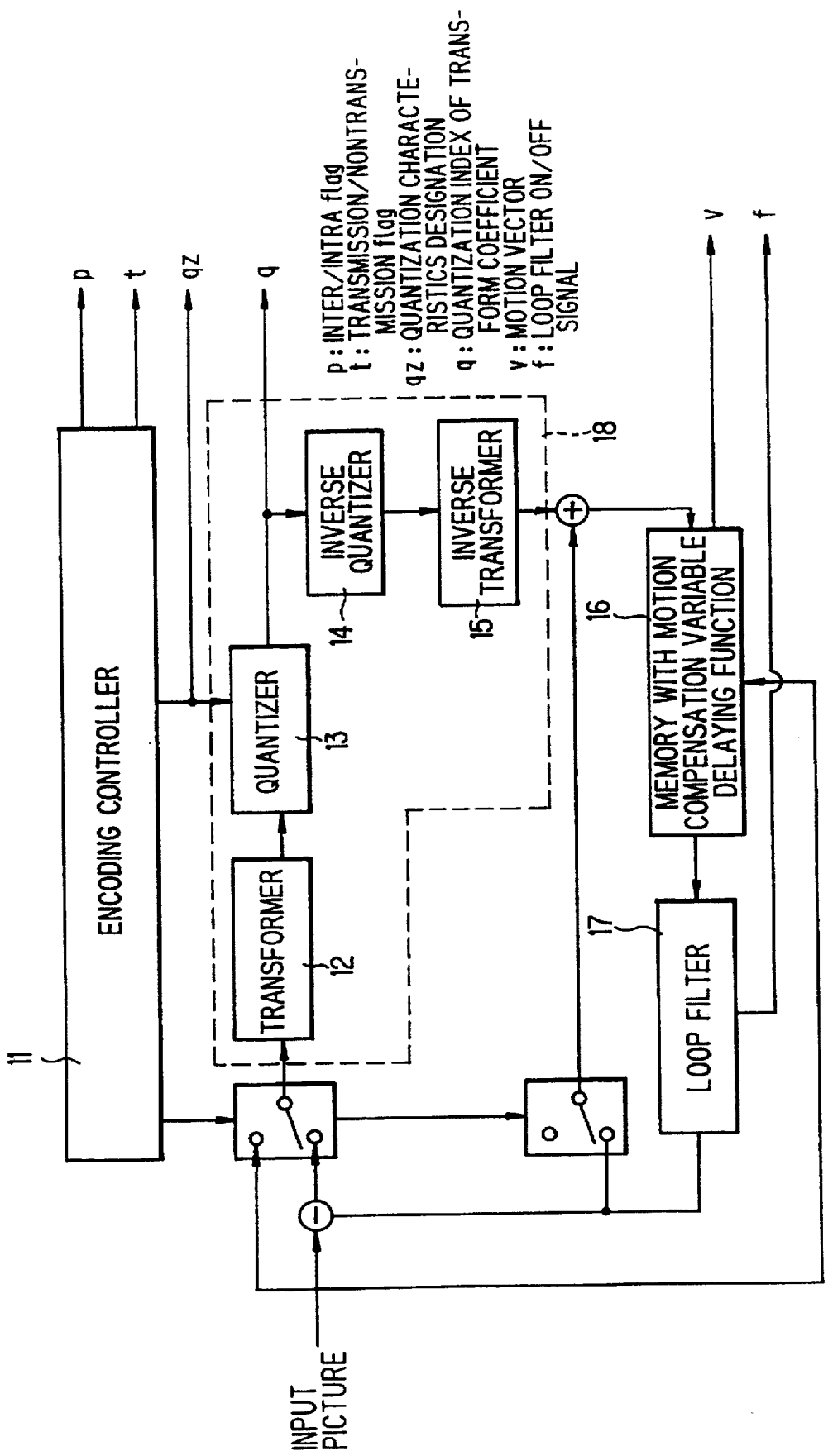
FIG. 2 is a block diagram showing the configuration of an encoder based on H. 261.
Figure 3:
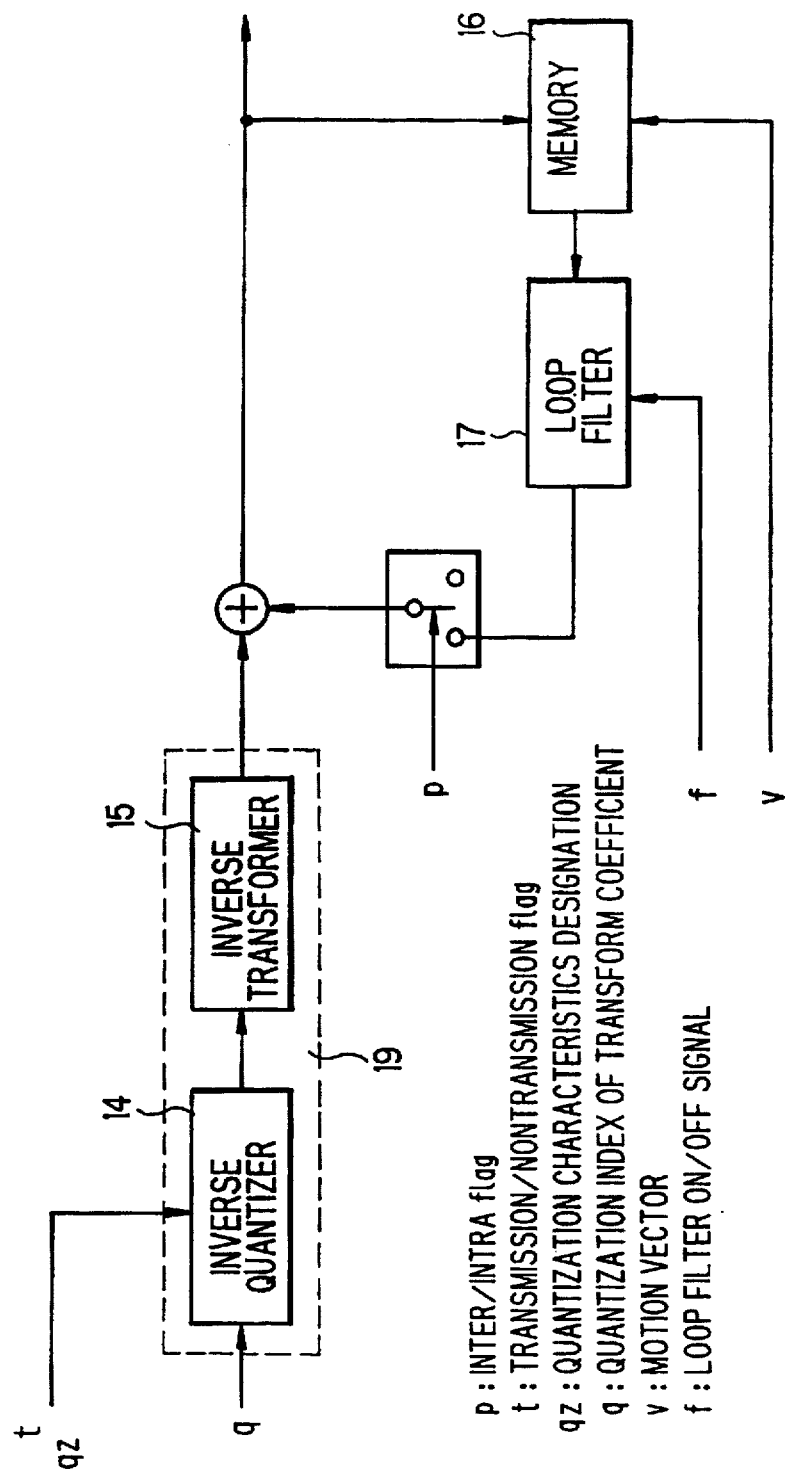
FIG. 3 is a block diagram showing the configuration of a decoder based on H. 261.
Figure 4:
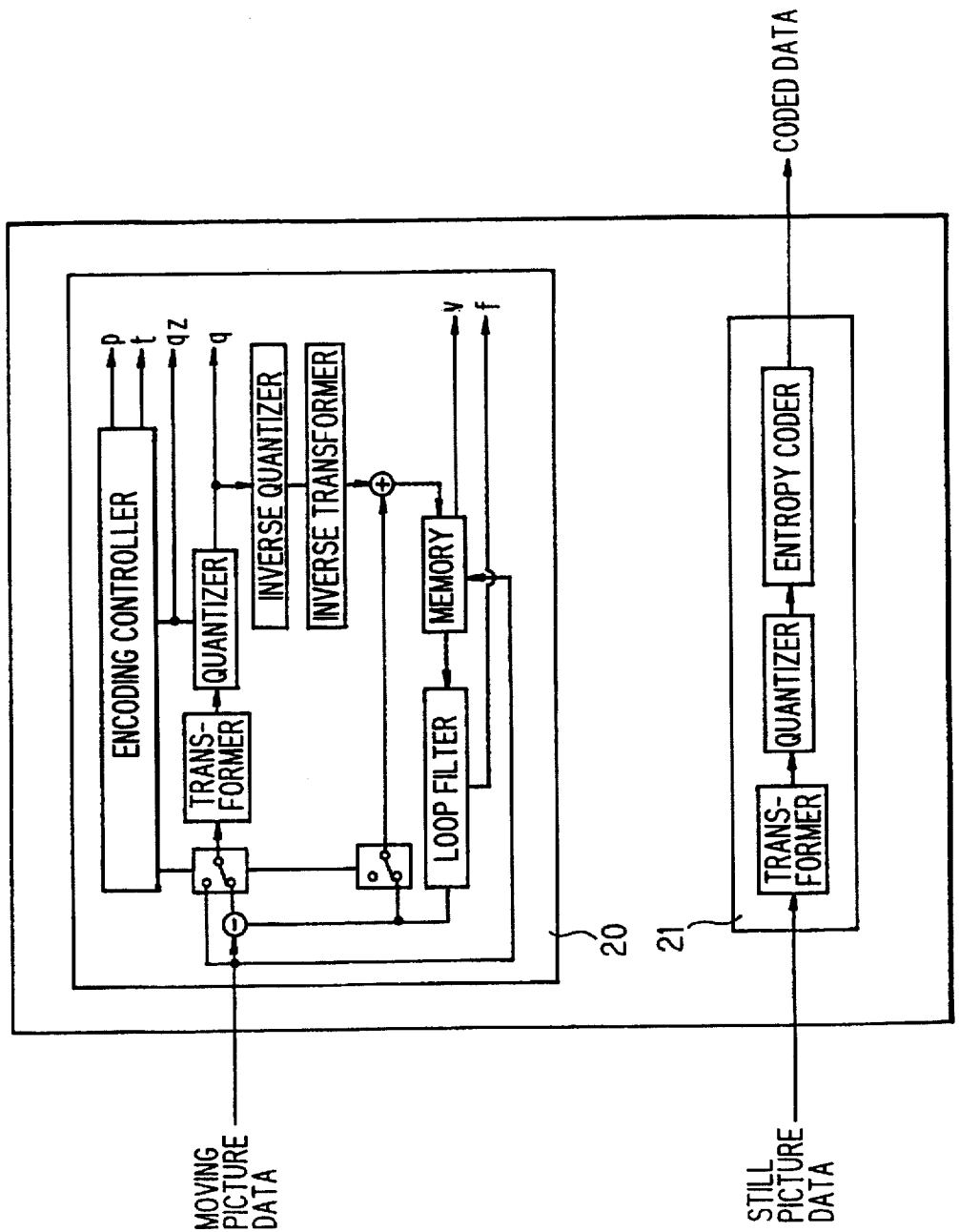
FIG. 4 is a block diagram showing the configuration of an encoder including a plurality of algorithms.
Figure 5:
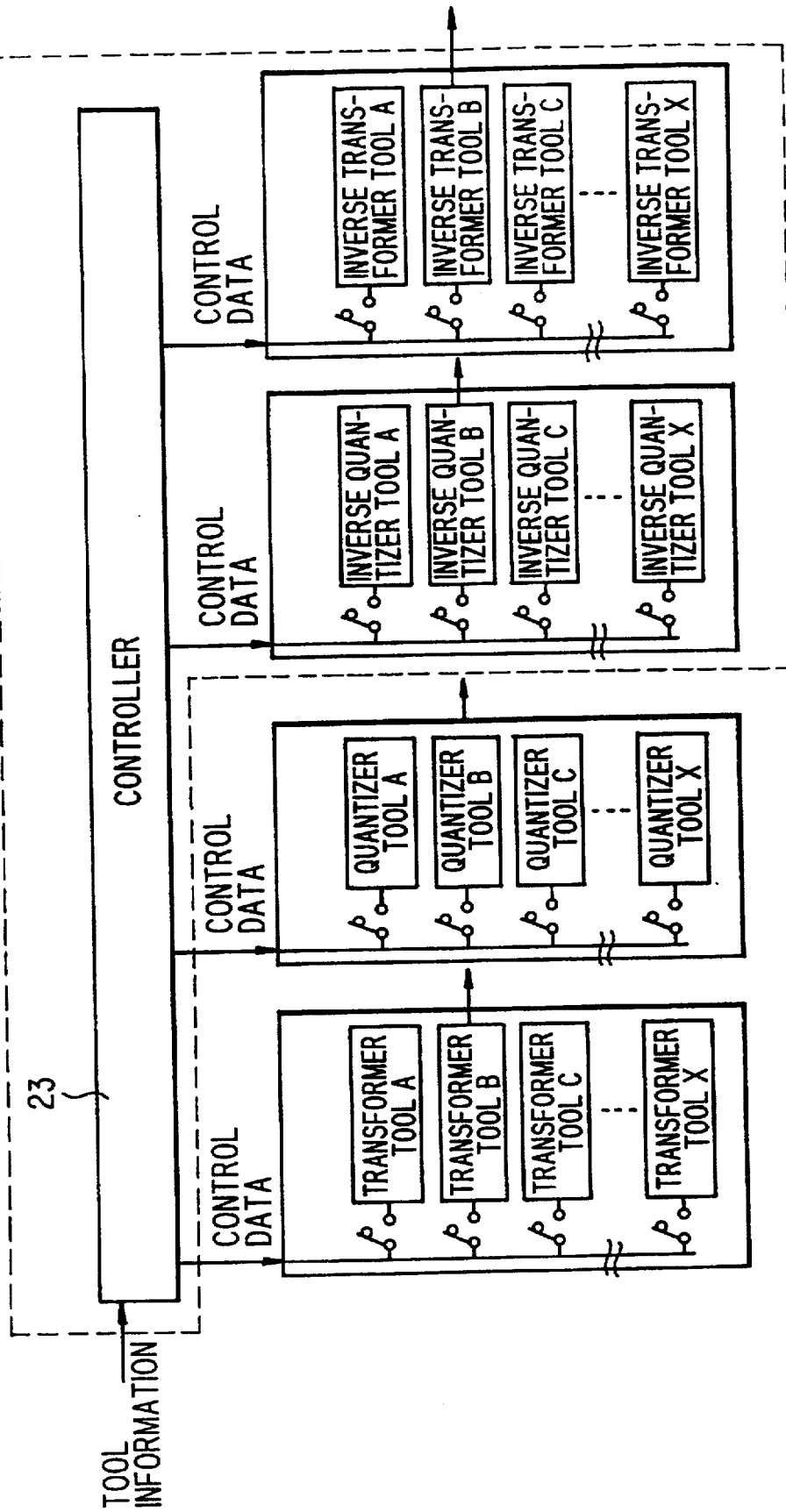
FIG. 5 is a block diagram showing the configuration of a decoder implemented by dedicated hardware and software.
Figure 6:
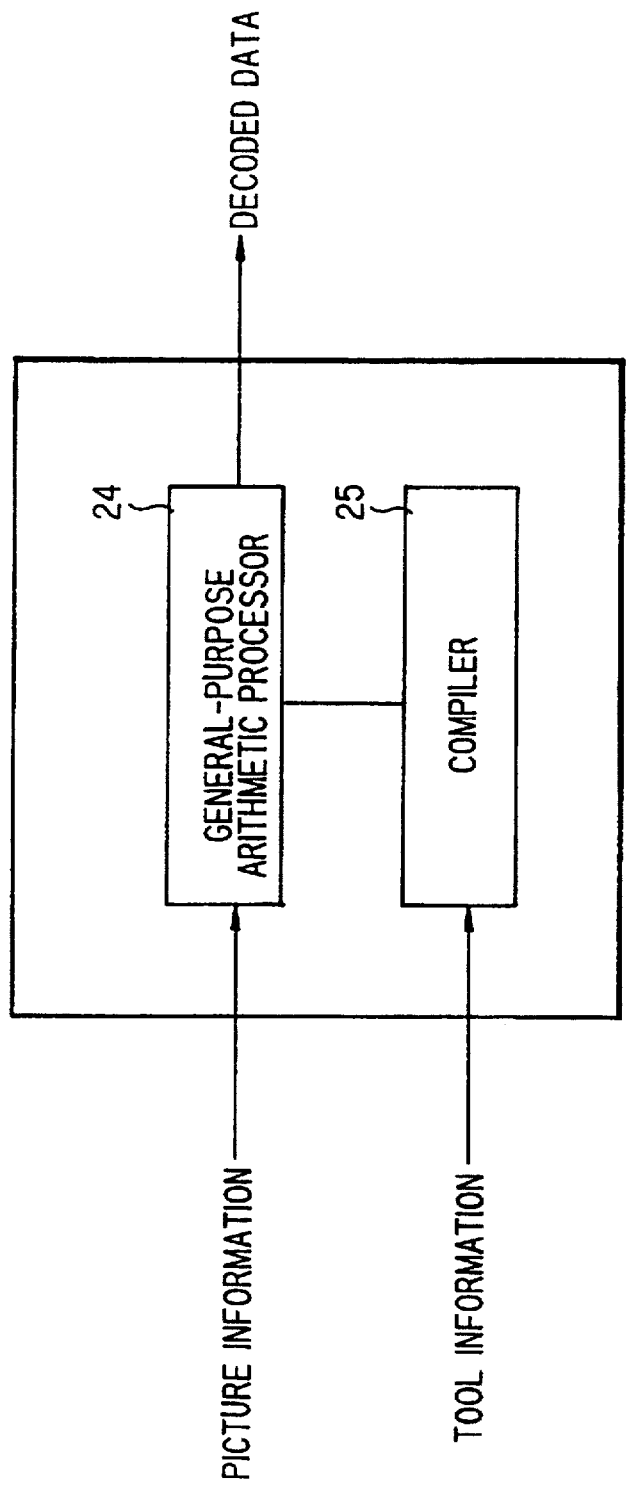
FIG. 6 is a block diagram showing the configuration of a decoder implemented by a general-purpose arithmetic processor and a compiler.
Figure 7:
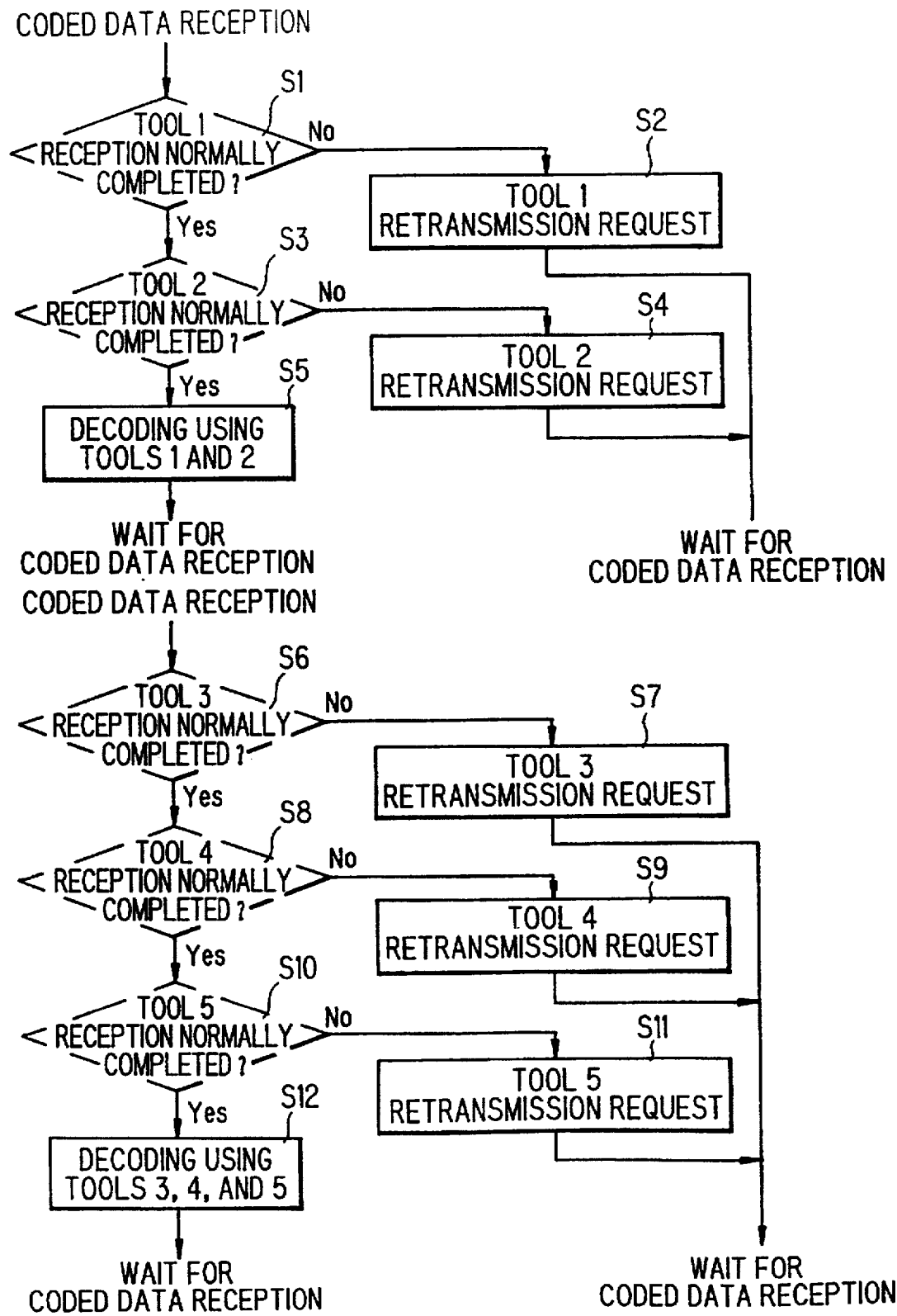
FIG. 7 is a flow chart for explaining an operation algorithm of the decoder.
Figure 8:
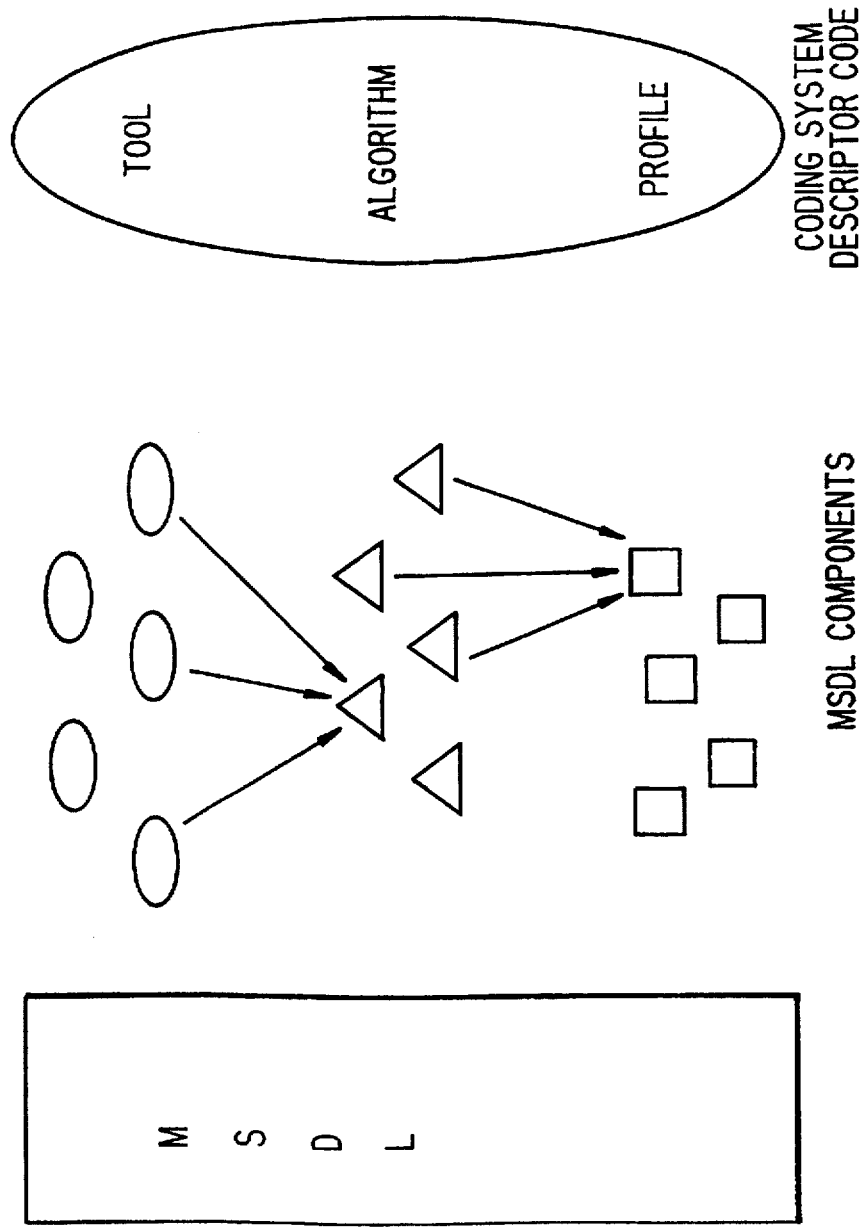
FIG. 8 is a view showing the components of MSDL.
Figure 9:
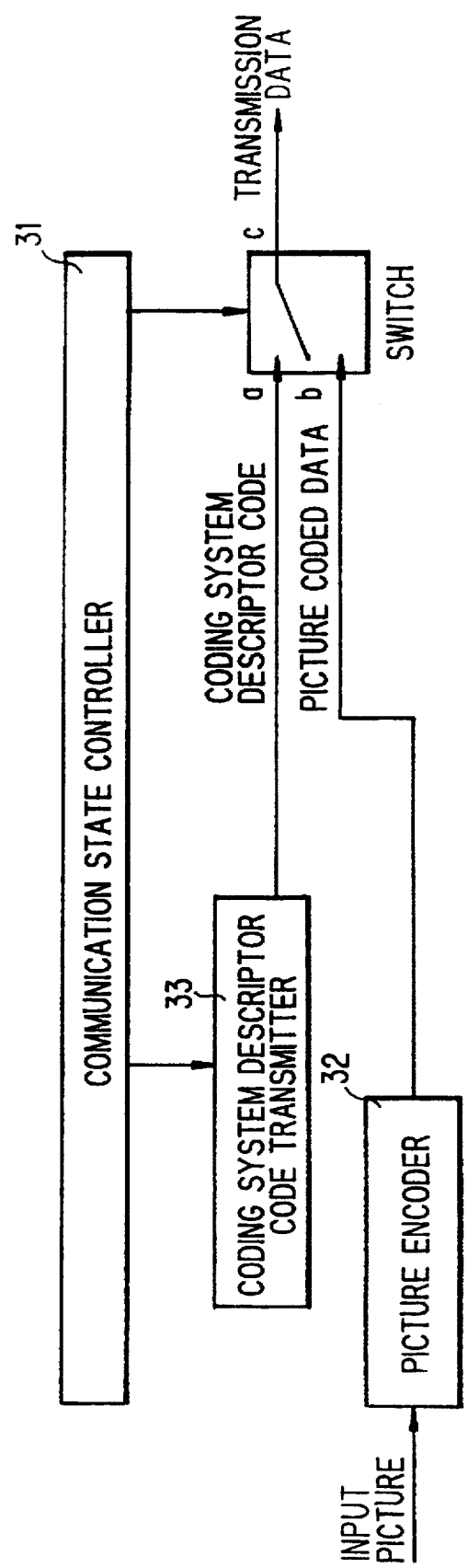
FIG. 9 a a block diagram showing a conventional picture encoding apparatus.

In contrast, in the prior art shown in FIG. 7, when the decoder detects an error in a transmission block of the tool 1, the encoder executes a procedure of retransmitting this transmission block (step S2), and the next block is not transmitted until this retransmission procedure is completed. Therefore, when a transmission path in which a large number of errors occur is used, the processing efficiency of the decoder decreases. In addition, the start of decoding of coded data received by the decoder is delayed.

In the second embodiment of the present invention as described above, a test routine for performing operation tests of tools is transmitted together with the tools. This allows a decoder to perform the operation tests of these tools. Furthermore, while an encoder is executing a procedure of retransmitting a tool found to abnormally operate, a decoder executes an operation test of the next tool. Consequently, the operating efficiencies of the decoder and the communication transmission path can be raised.

Third Embodiment

Figure 14:
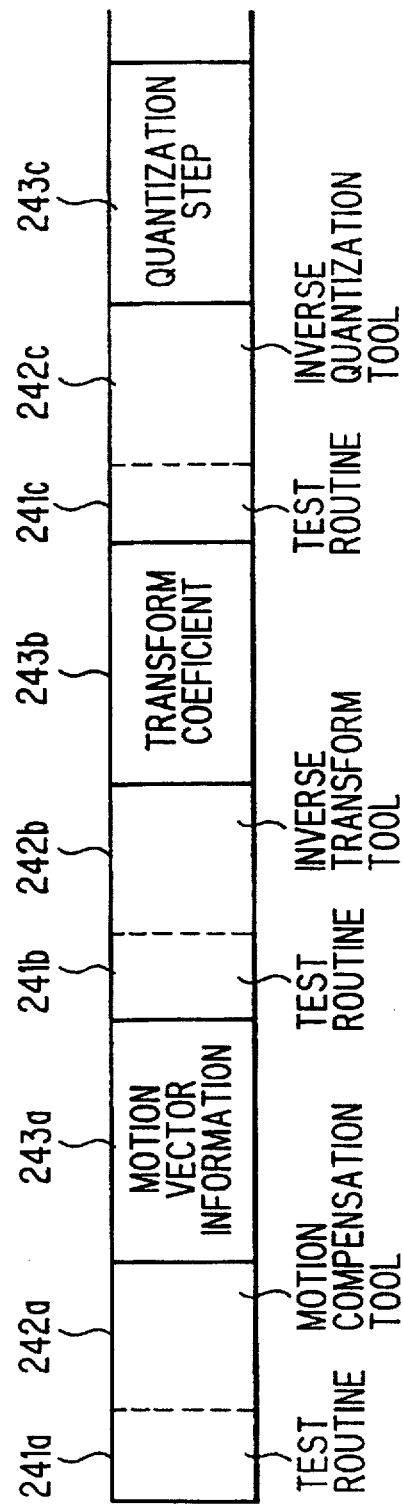
FIG. 14 is a view for explaining the format of a transmission data sequence according to a program download method of the third embodiment of the present invention.

FIG. 14 is a view showing another example of the format of a coded data sequence based on a flexible coding system such as MPEG4 according to the program download method of the present invention. Tools 242a, 242b, and 242c have test routines 241a, 241b, and 241c, respectively, and so a decoder on the reception side can independently perform operation tests of these tools.

Figure 15:
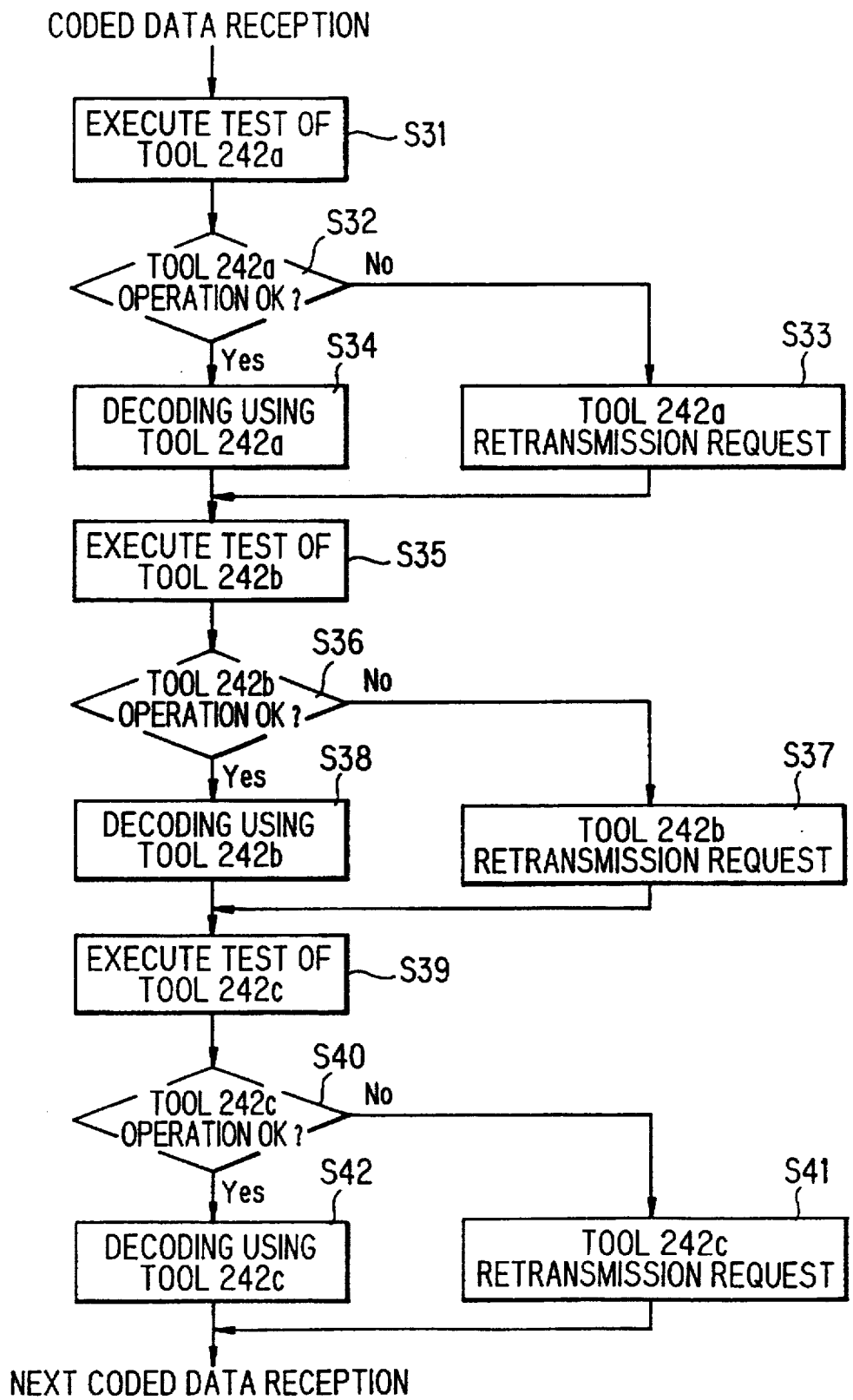
FIG. 15 is a flow chart for explaining an operation algorithm of a decoder according to the program download method of the third embodiment of the present invention.

FIG. 15 is a flow chart for explaining an algorithm for decoding coded data having the format shown in FIG. 14. When tool information contained in the coded data is received, an operation test of the tool is immediately executed on the basis of the test routine which the received tool information includes, and the operation of the tool is checked (step S31, S35, or S39). If it is determined that the operation is abnormal, a request to retransmit the tool is output to the encoder (step S33, S37, or S41). If the operation is found to be normal, data to be processed by the tool is decoded by using the tool (step S34, S38, or S42). That is, in this embodiment the operation test is executed in units of tools and the retransmission procedure is executed in units of tools.

More specifically, an operation test of the tool 242a contained in the received coded data is executed, and the result of the test is checked (step S31). If it is determined that the tool normally operates, decoding is performed by using the tool (step S34), and the flow advances to an operation test of the tool 242b. If the operation is found to be abnormal, a request to retransmit the tool 242a is output to the transmission side (step S33), and the flow immediately advances to the operation test of the tool 242b. Operation tests of the tools 242b and 242c are similarly performed and, in accordance with the test results, a request to retransmit a tool is output to the transmission side. A normally operating tool is immediately used in decoding. After the operation tests of a series of tools and decoding using these tools are executed, operation tests of the retransmitted tools are performed. A retransmission request is again output for a tool found to abnormally operate by this operation test. A tool found to normally operate is used to execute decoding. The decoder repeatedly requests the encoder to retransmit a tool as long as there is a tool found to abnormally operate by the operation test. While the encoder is executing the retransmission procedure, the decoder executes decoding using the tool found, to normally operate.

In the third embodiment as described above, as in the second embodiment, while the encoder is executing a retransmission procedure for a tool whose operation is found to be abnormal, the decoder can execute an operation test of the next tool. Accordingly, the operating efficiencies of the decoder and the communication transmission path can be raised. In addition, since each tool has a test routine, an operation test can be performed for each tool.

As is apparent from the above description, the second and third embodiments of the present invention achieve the following effects.

When an encoder transmits tools constituting an algorithm for decoding coded data, a test routine for performing an operation test of the algorithm is simultaneously transmitted. This allows a decoder to check whether the received decoding algorithm normally operates.

The test routine of the decoding algorithm includes test items of tools constituting the decoding algorithm. Therefore, the decoder can check for each tool constituting the decoding algorithm whether the tool can normally operate.

Also, since a test routine is provided for each tool constituting the decoding algorithm, an operation test can be independently performed for each tool. This allows the decoder to independently check for each received tool whether the tool normally operates.

The decoder can obtain a normal tool by requesting retransmission of a tool found to abnormally operate. Accordingly, the decoder can perform decoding free of errors by using this tool.

Furthermore, when a tool is found to normally operate by an operation test performed by the decoder, decoding of coded data (picture information) to be processed by the tool is immediately started. Consequently, the operating efficiencies of the decoder and the communication transmission path can be raised.

Fourth Embodiment

Figure 16:
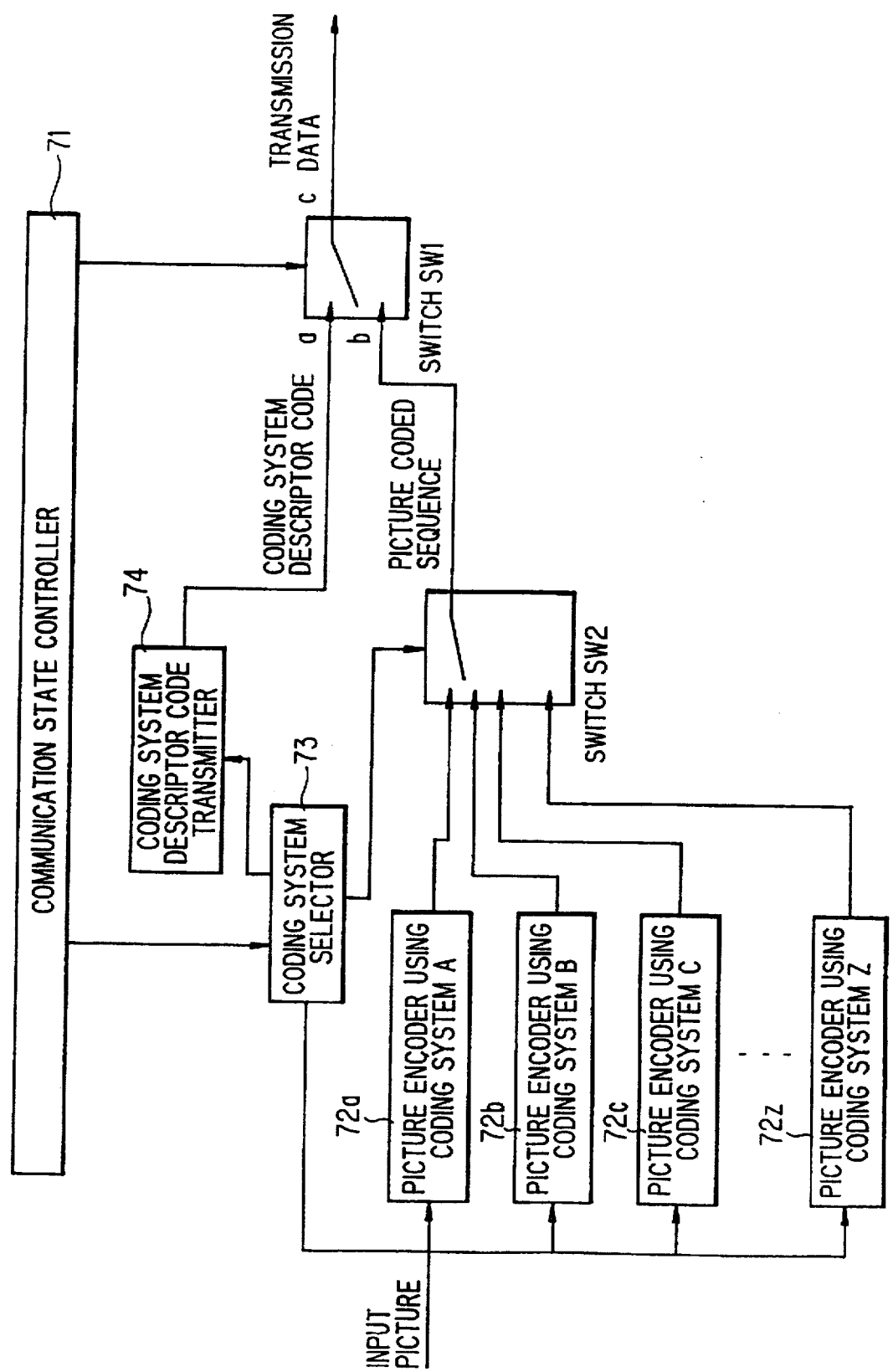
FIG. 16 is a block diagram of a picture encoding apparatus of the present invention.

FIG. 16 is a block diagram of a picture encoding apparatus of the present invention. A communication state controller 71 manages the states of encoders and controls a switch SW1 for switching transmission of picture coded data and transmission of a coding system descriptor code. A picture encoder 72a using a coding system A encodes an input picture by using an encoding system indicated by the coding system descriptor code A. A picture encoder 72b using a coding system B encodes an input picture by using an encoding system indicated by the coding system descriptor code B. A picture encoder 72c using a coding system C encodes an input picture by using an encoding system indicated by the coding system descriptor code C. A picture encoder 72z using a coding system Z encodes an input picture by using an encoding system indicated by the coding system descriptor code Z. A coding system selector 73 is connected to the communication state controller 71. The coding system selector 73 selects a coding system for each frame and controls a switch SW2 for selecting output data to be transmitted from the picture encoders. A coding system descriptor code transmitter 74 is connected to the coding system selector 73 and transmits a coding system descriptor code. To transmit a coding system descriptor code, contacts a and c of the switch SW1 are closed. To transmit picture coded data, contacts b and c of the switch SW1 are closed.

Figure 17:
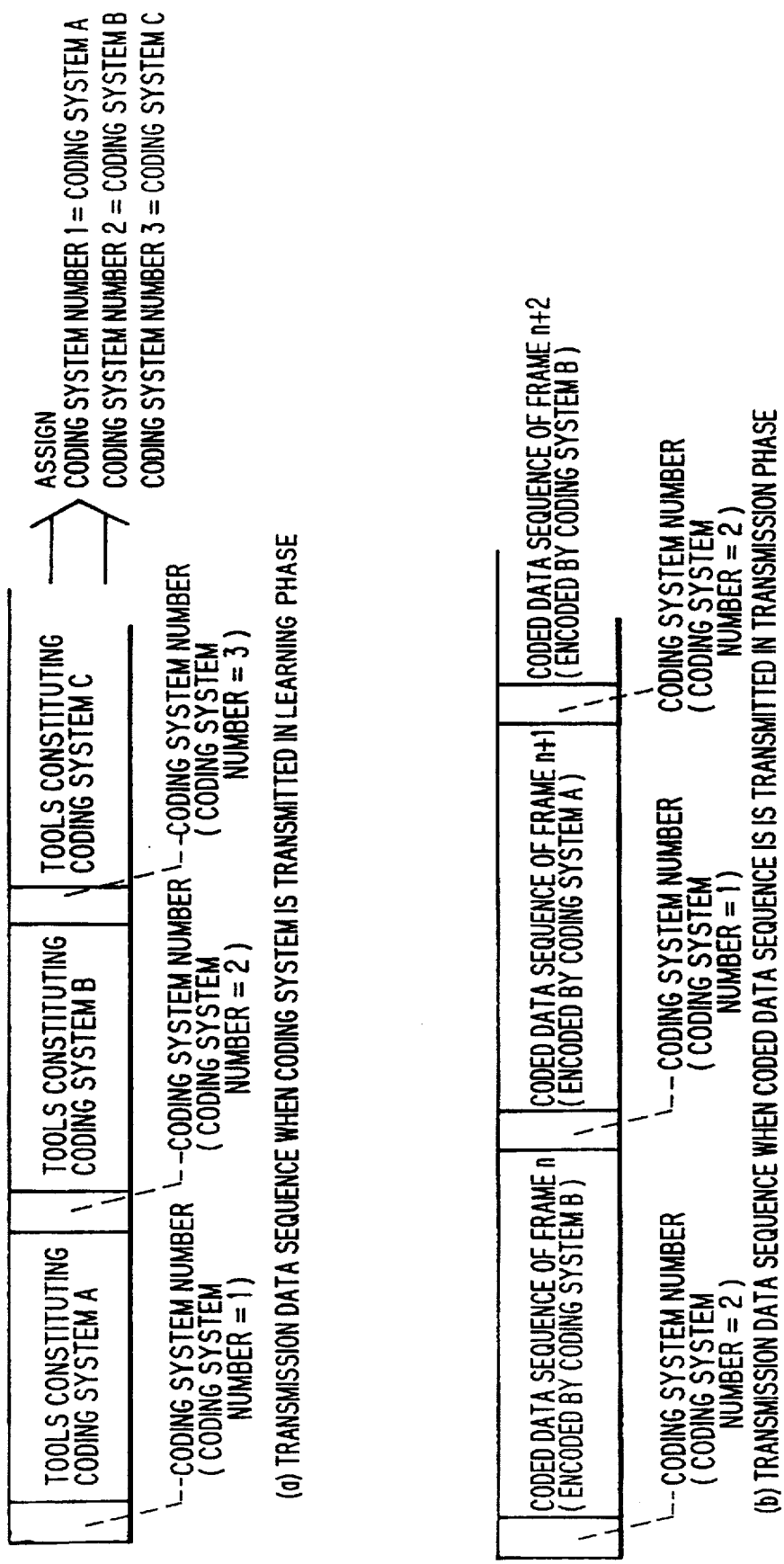
FIGS. 17 shows data sequences transmitted from the picture encoding apparatus of the present invention.

FIG. 17 shows examples of data sequences transmitted from the picture encoding apparatus of the present invention. In Configuration Phase, limiting items such as the memory capacity of the partner terminal are checked. In Learning Phase, the number of coding system descriptor codes within the range of the memory capacity of the partner terminal are transmitted. In practice, tools constituting the coding system are transmitted as described above. More specifically, the contacts a and c of the switch SW1 in FIG. 16 are closed, and coding system numbers are added to coding system descriptor codes to be transmitted so that the coding system numbers are in a one-to-one correspondence with the coding system descriptor codes. One practical example will be described below with reference to FIG. 17(a). Coding system number 1 is first transmitted, and tools constituting the coding system A are subsequently transmitted. As a consequence, the coding system A is assigned to coding system number 1. When the transmission of the coding system A is completed, coding system number 2 is transmitted and tools constituting the coding system B are subsequently transmitted. Likewise, coding system number 3 and tools constituting the coding system C are transmitted. By a series of these operations, the coding systems A, B, and C are assigned to coding system numbers 1, 2, and 3, respectively.

FIG. 17(b) shows an example of a transmission data sequence in Transmission Phase for transmitting coded data. In Transmission Phase, the contacts b and c of the switch SW1 in FIG. 16 are closed, and a coding system number is added to the leading position of each frame. This number is made correspond to the coding system in Learning Phase. This number clearly indicates the coding system by which the coded data sequence following the number is to be decoded. A practical operation will be described with reference to FIG. 17(b). If it is determined that a frame n is to be encoded by the coding system B, coding system number 2 to which the coding system B is assigned is transmitted. Subsequently, coded data obtained by encoding the frame n by using the coding system B is transmitted. If it is determined that a next frame n+1 is to be encoded by the coding system A, coding system number 1 to which the coding system A is assigned is transmitted. Subsequently, coded data obtained by encoding the frame n+1 by using the coding system A is transmitted. If it is determined that a next frame n+2 is to be encoded by the coding system B, coding system number 2 is transmitted and coded data obtained by encoding the frame n+2 by using the coding system B is transmitted.

Figure 18:
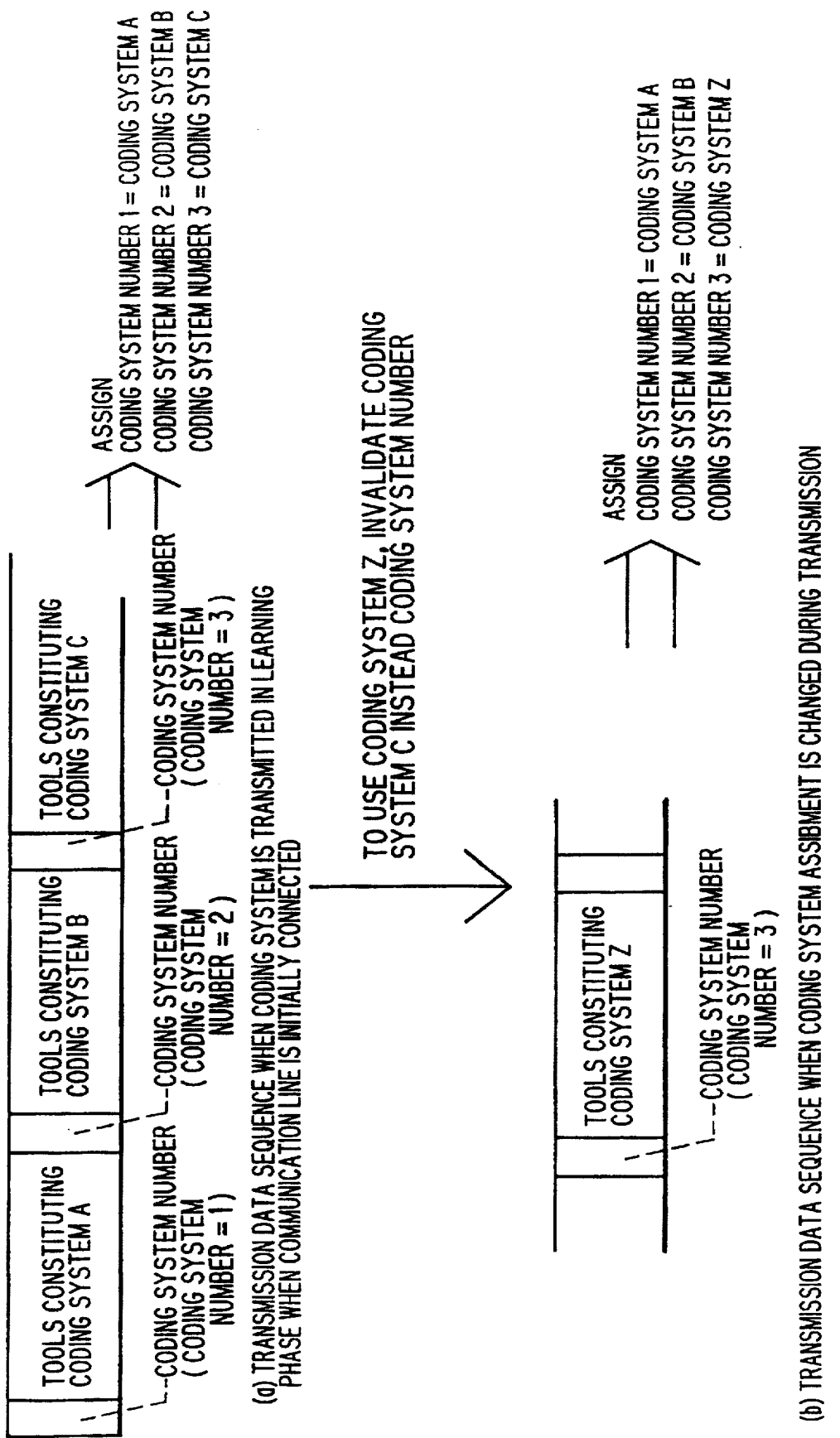
FIGS. 18 shows transmission data sequences when coding system assignment is changed.

FIG. 18 shows examples of transmission data sequences when coding system assignment is changed. FIG. 18 shows a case where the number of coding systems to be transmitted is limited to 3 due to the memory capacity of the partner terminal. As in the case of FIG. 17, three coding system descriptor codes of the coding systems A, B, and C are transmitted in Learning Phase when a communication line is initially connected, and the coding systems A, B, and C are assigned to coding system numbers 1, 2, and 3, respectively. Assume that the user wishes to use the coding system Z thereafter. If the coding system recognition capacity of the partner terminal is large enough, the coding system Z is assigned to coding system number 4 and transmitted. However, if the partner terminal can recognize only three coding systems due to the influence of the limited memory capacity, it is necessary to invalidate one of the coding systems previously transmitted. Assume that the coding system C is to be made invalid. Since the coding system C is assigned to coding system number 3, it is only necessary to assign the coding system Z to coding system number 3 and transmit the coding system. That is, as shown in FIG. 18(b), coding system number 3 is transmitted and subsequently tools constituting the coding system Z are transmitted.

Figure 19:
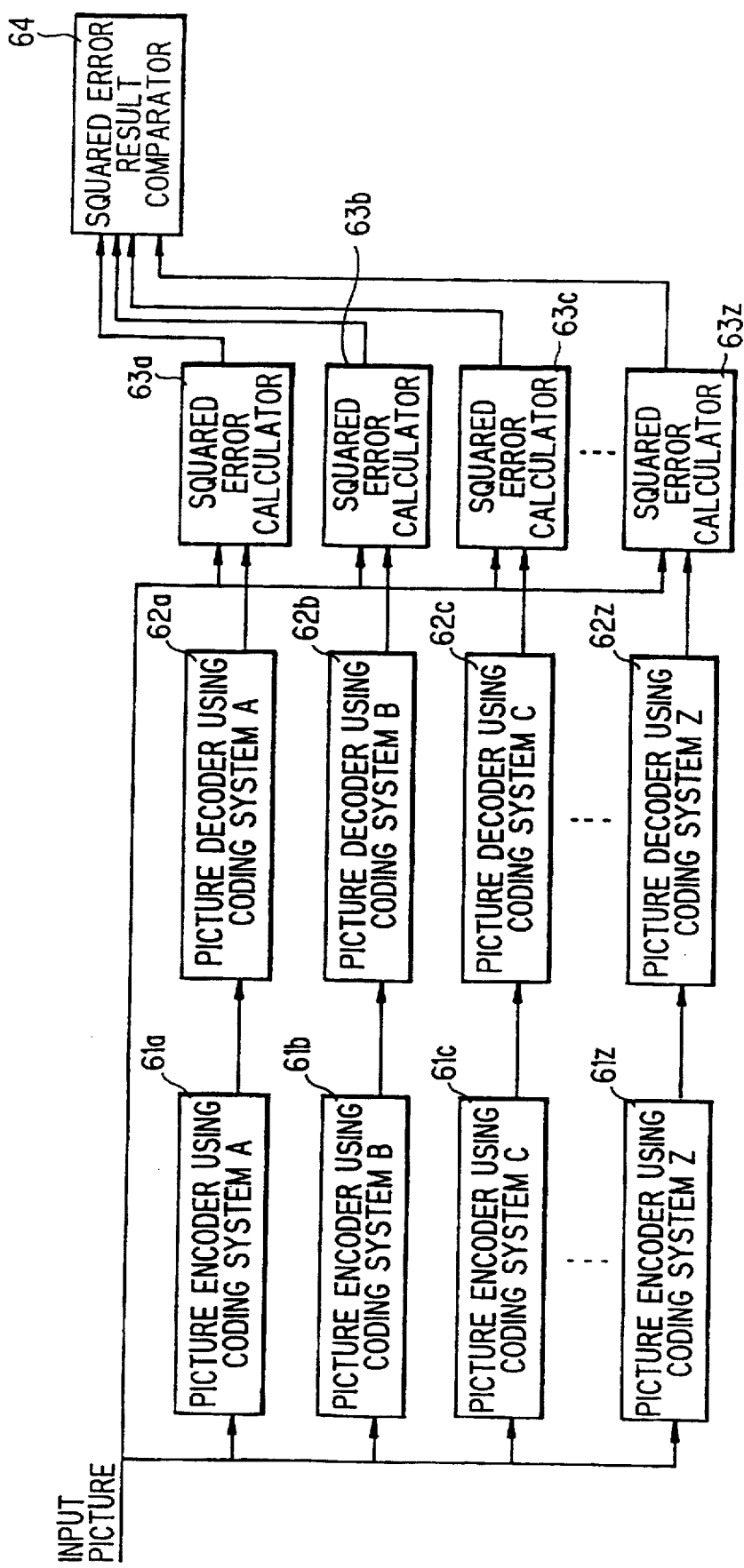
FIG. 19 is a block diagram of a coding system selection method using squared error calculations.

FIG. 19 is a block diagram showing a squared error selection method as one coding system selection method. In FIG. 19, picture encoders 61a to 61z using the respective coding systems encode an input picture by using encoding systems indicated by the respective coding systems. Picture decoders 62a to 62z using the respective coding systems are connected to the picture encoders 61a to 61z, respectively, and decode the coded picture data by using decoding systems indicated by the respective coding systems. Squared error calculators 63a to 63z are connected to the picture decoders 62a to 62z, respectively, and calculate squared errors between the decoded pictures encoded/decoded by the respective coding systems and the input picture. A squared error result comparator 64 is connected to the squared error calculators 63a to 63z and compares the squared error evaluations of the results of encoding/decoding based on the respective coding systems.

In this method, a suitable picture coding system is selected for each frame. That is, encoding and decoding are performed by using all coding systems, squared errors between the decoded pictures and the input picture are calculated, and a coding system having the smallest squared error is selected. A squared error is obtained by calculating the difference of an encoded/decoded picture from an input picture for each pixel and accumulating the differences. That is, an encoded/decoded picture having a good squared error accumulation result is close to an input picture. Therefore, when a coding system having the smallest squared error is chosen for each frame, pictures closest to the respective input pictures can be transmitted to the partner terminal for all frames.

Figure 20:
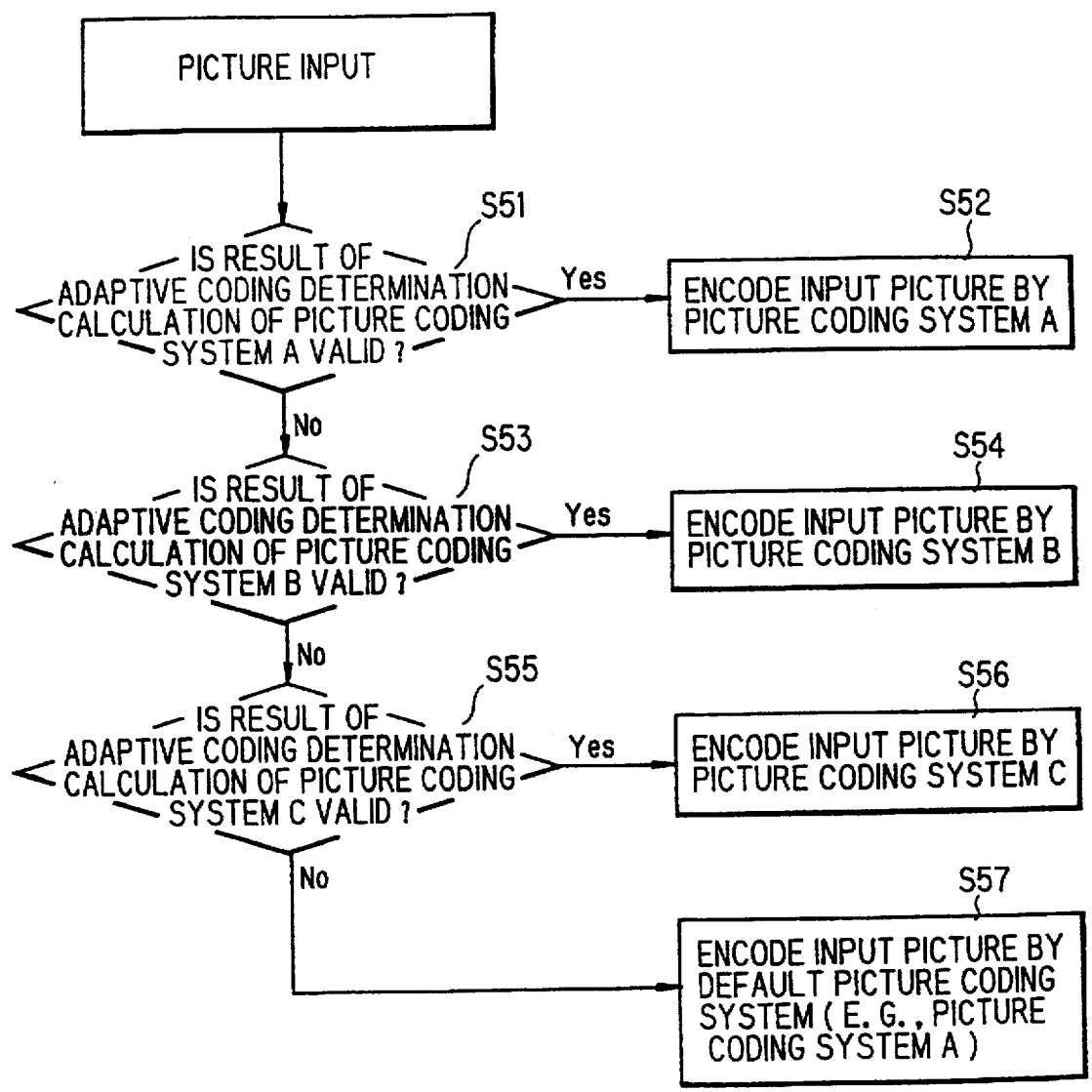
FIG. 20 is a flow chart of a picture adaptive coding system selection method.

FIG. 20 is a flow chart of a picture adaptive coding system selection method as a second coding system selection method. In this picture adaptive coding system selection method, whether an input picture is an appropriate one to be encoded by a certain coding system is checked for each frame. This determination is done by performing a certain calculation for an input picture and checking on the basis of the calculation result whether the picture is an appropriate one to be encoded by using a coding system of interest.

As the calculation used in determination of whether an input picture is an appropriate picture, a DCT calculation is performed for a picture coding system effective when a picture has a larger number of fine patterns. That is, an adaptive coding determination calculation is performed in which effectiveness is determined when the accumulation of coefficients of nth order or more is a predetermined value or larger. For a picture coding system effective when a picture has a large motion component, an adaptive coding determination calculation is performed in which effectiveness is determined when the accumulation of differences between frames in each pixel is a predetermined amount or more.

In the flow chart of FIG. 20, one of three coding systems, i.e., the coding systems A, B, and C, is selected. First, a picture is input and whether the input picture is an appropriate one to be encoded by using the coding system A is checked. That is, an adaptive coding determination calculation of the coding system A is performed, and whether the calculation result satisfies the criterion for the coding system A is checked (step S51). If this input picture satisfies the criterion of whether the picture is an appropriate one to be encoded by the coding system A, it is determined that the input picture is encoded by the coding system A (step S52). If the input picture does not satisfy the criterion, whether the input picture is an appropriate one to be encoded by the coding system B is checked. That is, an adaptive coding determination calculation of the coding system B is performed, and whether the calculation result satisfies the criterion for the coding system B is checked (step S53). If this input picture satisfies the criterion of whether the picture is an appropriate one to be encoded by the coding system B, it is determined that the input picture is encoded by the coding system B (step S54). If the input picture does not satisfy the criterion, whether the input picture is an appropriate one to be encoded by the coding system C is checked. That is, an adaptive coding determination calculation of the coding system C is performed, and whether the calculation result satisfies the criterion for the coding system C is checked (step S55). If this input picture satisfies the criterion of whether the picture is an appropriate one to be encoded by the coding system C, it is determined that the input picture is encoded by the coding system C (step S56). If the input picture does not satisfy the criterion, it is determined that the input picture is encoded by a previously determined default coding system (step S57).

The fourth embodiment of the present invention described above can achieve the following effects.

The apparatus includes a plurality of picture encoding means for encoding an input picture by using different coding systems and a coding system selecting means for selecting a coding system to be used. A proper picture coding system is selected for each frame of an input picture, and the partner terminal is informed of the coding system by which each frame of data is encoded. Therefore, picture coding systems can be dynamically switched during communication.

The number of coding systems to be transmitted immediately after communication is started is set in accordance the memory capacity of the partner terminal. If the user wants to use a coding system other than the previously transmitted coding systems, one of the already transmitted coding systems is made invalid, and the coding system of interest is transmitted in place of the nullified one and made valid. This makes the coding system other than the previously transmitted coding systems usable during communication.

A plurality of coding system descriptor codes received from the partner terminal when communication is started or during communication are correctly recognized, and the coding system by which the received picture coded data is encoded is checked for each frame. Accordingly, means for decoding the picture coded data can be dynamically switched during communication.

The coding system selecting means comprises a plurality of picture decoding means which perform decoding by the same coding systems as picture encoding, and the number of which equals the number of the coding systems, a plurality of squared error calculating means which calculate squared errors between picture encoded/decoded results and an input picture, and the number of which equals the number of the coding systems, and a squared error determining means for determining which coding system has the smallest squared error. In selecting a coding system by which encoding is performed, squared errors of the individual coding systems are calculated for each frame. Consequently, a coding system having the smallest squared error can be chosen for each frame.

A coding system selector includes a picture adaptive coding system selector which selects an appropriate coding system in accordance with an input picture. A coding system by which a picture is appropriately encoded is determined for each frame. Accordingly, an appropriate coding system can be determined when encoding is performed.

What is claimed is:

1. A picture reproducing apparatus comprising:

a receiver for receiving coded picture data and a decoding program which describes a decoding algorithm used to reproduce the coded picture data;

a program converter for converting the decoding program into decoder reconfiguration data;

a decoder for reproducing picture data from the coded picture data received by said receiver, said decoder including;

an inverse quantizer, the contents of which are changeable, for inversely quantizing quantized picture data, and an inverse transformer, the contents of which are changeable, for inversely transforming transformed picture data; and a controller for controlling said receiver, said program converter, and said picture decoder, wherein the contents of the inverse quantizer and the inverse transformer of said decoder are changed in accordance with the decoder reconfiguration data obtained by said program converter.

2. The apparatus according to claim 1, wherein said program converter includes;

a divider for dividing the decoding algorithm into a first program portion which is used to convert the decoding program, described in a logical description language, into reconfiguration data, and a second program portion which is executed by said controller during picture reproduction, a first converter for converting the first program portion into reconfiguration data, and a second converter for converting the second program portion into a form which can be interpreted and executed by said controller.

3. A picture reproducing apparatus comprising:

a receiver for receiving coded picture data, a plurality of decoding tools which together constitute a decoding algorithm used to reproduce the coded picture data, and a test routine used to test whether the decoding tools which together constitute the decoding algorithm are operating normally; and a decoder for reproducing picture data from the coded picture data using a decoding algorithm, the decoding algorithm used by said decoder being reconfigured in accordance with the plurality of decoding tools received by said receiver, said decoder performing an operation test of the reconfigured algorithm with the received test routine to determine whether the reconfigured algorithm is operating normally.

4. The apparatus according to claim 3, wherein the test routine includes a test item for each tool which is part of the decoding algorithm, and said decoder performs an operation test of the algorithm for each tool in accordance with the test item and checks on the basis of the result of the operation test for each tool whether the reconfigured algorithm operates normally.

5. The apparatus according to claim 3, wherein the test routine is provided for each tool, and said decoder performs an operation test for each tool in accordance with the test routine provided for the tool and checks on the basis of the result of the operation test for each tool whether the reconfigured algorithm operates normally.

6. The apparatus according to claim 3, wherein said decoder requests retransmission of a tool which is not found to operate normally, and on the basis of the request an encoder retransmits to said decoder the tool not found to operate normally.

7. The apparatus according to claim 3, wherein when said decoder determines that a tool operates normally, said decoder immediately executes a procedure of decoding coded data to be processed by that tool.

8. A picture reproducing apparatus for transmitting coded picture data and a decoding algorithm for reproducing the coded picture data, and reconfiguring a decoding processor in accordance with the received algorithm, comprising:

a picture encoder for encoding an input picture;

a coding system descriptor code transmitter for transmitting to a partner terminal a coding system descriptor code describing a coding system used by said picture encoder;

a communication state controller for managing a state of communication and, in accordance with the state of communication, selecting one of transmission of the picture coded data and transmission of the coding system descriptor code;

a plurality of picture encoders for encoding an input picture by using different coding systems; and a coding system selector for determining a coding system to be used, wherein an appropriate picture coding system is selected for each frame of an input picture and, when picture coded data is transmitted to the partner terminal, the partner terminal is informed of a coding system by which each frame of data is encoded, thereby dynamically switching picture coding systems during communication.

9. The apparatus according to claim 8, wherein the number of coding system descriptor codes transmitted immediately after communication begins is set in accordance with a memory capacity of the partner terminal and, when a user wishes to use a coding system other than the previously transmitted coding systems, one of the previously transmitted coding systems is made invalid and the coding system descriptor code to be used instead is transmitted and made valid.

10. The apparatus according to claim 9, wherein a plurality of coding system descriptor codes received from the partner terminal when communication begins or while communication is being performed are correctly recognized, and a coding system by which received picture coded data is encoded is checked for each frame, thereby dynamically switching picture coded data decoding means during communication.

11. The apparatus according to claim 10, wherein said coding system selector includes a number of picture encoders equal to the number of coding systems for performing picture coding, a number of picture decoders equal to the number of coding systems, a number of squared error calculators equal to the number of coding systems, each of said squared error calculators calculating a squared error between a picture encoded/decoded result and an input picture as an original picture, and a squared error result comparator which checks which coding system has a smallest squared error in order to select a coding system for performing coding.

12. The apparatus according to claim 9, wherein said coding system selector includes a number of picture encoders equal to the number of coding systems for performing picture coding, a number of picture decoders equal to the number of coding systems, a number of squared error calculators equal to the number of coding systems, each of said squared error calculators calculating a squared error between a picture encoded/decoded result and an input picture as an original picture, and a squared error result comparator which checks which coding system has a smallest squared error, in order to select a coding system for performing coding.

13. The apparatus according to claim 8, wherein a plurality of coding system descriptor codes received from the partner terminal when communication begins or while communication is being performed are correctly recognized, and a coding system by which received picture coded data is encoded is checked for each frame, thereby dynamically switching picture coded data decoding means during communication.

14. The apparatus according to claim 13, wherein said coding system selector includes a number of picture encoders equal to the number of coding systems for performing picture coding, a number of picture decoders equal to the number of coding systems, a number of squared error calculators equal to the number of coding systems, each of said squared error calculators calculating a squared error between a picture encoded/decoded result and an input picture as an original picture and a squared error result comparator which checks which coding system has a smallest squared error in order to select a coding system for performing coding.

15. The apparatus according to claim 8, wherein said coding system selector includes a number of picture encoders equal to the number of coding systems for performing picture encoding, a number of decoders picture equal to the number of coding systems, a number of squared error calculators equal to the number of coding systems, each of said squared error calculators calculating a squared error between a picture encoded/decoded result and an input picture as an original picture, and a squared error result comparator which checks which coding system has a smallest squared error, in order to select a coding system for performing coding.

16. The apparatus according to any one of claims 8 to 11, wherein said coding system selector includes a picture adaptive coding system selector for selecting an appropriate coding system in accordance with an input picture, and determines a coding system for performing coding by checking, for each frame, which coding system is appropriate to encode a picture.

17. A method for reproducing coded picture data comprising the steps of:

receiving coded picture data and a decoding program which describes a decoding algorithm used to reproduce the coded picture data;

converting the decoding program into decoder reconfiguration data;

reproducing picture data from the coded picture data received by said receiver, said reproducing being achieved by;

dequantizing quantized picture using an inverse quantizer, the contents of which are changeable, and inverse transforming transformed picture data using an inverse transformer, the contents of which are changeable; and controlling the operations of said receiver, said program converter, and said picture decoder, wherein the inverse quantizer and inverse transformer which respectively perform said dequantizing and inverse transforming steps are reconfigured in accordance with the decoder reconfiguration data obtained by said program converting step.

18. The method according to claim 17, wherein said converting step divides the decoding algorithm into a first program portion used to reconfigure the inverse quantizer and the inverse transformer, and a second program utilized in said controlling step during reproduction.

19. A method for reproducing coded picture data comprising the steps of:

receiving coded picture data, a plurality of decoding tools which together constitute a decoding algorithm used to reproduce the coded picture data, and a test routine used to test whether the decoding tools which together constitute the decoding algorithm are operating normally; and reproducing picture data from the coded picture data using a decoder, the decoder used to reproduce coded picture data being reconfigured in accordance with the plurality of decoding tools received, wherein the decoder further performs the step of testing the reconfigured decoding algorithm with the received test routine to determine whether the reconfigured algorithm is operating normally.

20. The method according to claim 19, wherein the test routine includes a test item for each tool which is part of the decoding algorithm, and an operation test is performed on each tool in accordance with the corresponding test item to determine whether the reconfigured algorithm operates properly.

21. The method according to claim 19, further comprising the step of:

requesting retransmission of a tool which is found not to operate normally.

22. The method according to claim 19, wherein, when a tool is found to normally operate, a decoding procedure performed by that tool is immediately executed.

23. A method for transmitting coded picture data comprising the steps of:

encoding an input picture;

transmitting to a partner terminal a coding system descriptor code describing a coding system used in said encoding step;

managing a state of communication and, in accordance with the state of communication, performing either a step of transmitting the coded picture data or transmitting the coding system descriptor code; and selecting a coding system to be used for subsequent picture data from a plurality different picture coding systems;

wherein an appropriate picture coding system is selected for each frame of an input picture, and when picture coded data is transmitted to the partner terminal, the partner terminal is informed of the coding system by which each frame of data is encoded, thereby dynamically switching picture coding systems during communication.

24. The method according to claim 23, wherein the number of coding system descriptor codes initially transmitted is set in accordance with a memory capacity of the partner terminal, and, when a user wishes to use a coding system other than the previously used coding system, one of the previously transmitted coding systems is made invalid and the coding system descriptor code to be used instead is transmitted and made valid.

25. The method according to claim 23, wherein a plurality of coding system descriptor codes received from the partner terminal when communication begins or while communication is being performed are correctly recognized, and a coding system by which received picture coded data is encoded is checked for each frame, thereby dynamically switching picture decoding during communication.

26. The method according to claim 23, where the coding system used to perform coding is selected in accordance with a least squared error calculation.

* * * * *